(12) United States Patent
Bronson et al.

(10) Patent No.: US 8,458,405 B2
(45) Date of Patent: Jun. 4, 2013

(54) CACHE BANK MODELING WITH VARIABLE ACCESS AND BUSY TIMES

(75) Inventors: Timothy C. Bronson, Round Rock, TX (US); Garrett M. Drapala, Poughkeepsie, NY (US); Hieu T. Huynh, Pflugerville, TX (US); Kenneth D. Klapproth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/821,891

(22) Filed: Jun. 23, 2010

(65) Prior Publication Data

US 2011/0320729 A1 Dec. 29, 2011

(51) Int. Cl.
*G06F 12/00* (2006.01)
*G06F 13/00* (2006.01)
*G06F 13/28* (2006.01)

(52) U.S. Cl.
USPC .................................. 711/130; 711/E12.038

(58) Field of Classification Search
USPC .......................................... 711/130, E12.038
See application file for complete search history.

(56) References Cited

U.S. PATENT DOCUMENTS

| | | | | |
|---|---|---|---|---|
| 5,355,467 | A | * | 10/1994 | MacWilliams et al. ........ 711/146 |
| 5,875,466 | A | * | 2/1999 | Wakerly ........................ 711/138 |
| 5,875,470 | A | * | 2/1999 | Dreibelbis et al. ............. 711/147 |
| 7,394,716 | B1 | | 7/2008 | Chakrapani et al. |
| 7,685,354 | B1 | * | 3/2010 | Hetherington et al. ........... 711/5 |
| 2003/0065884 | A1 | * | 4/2003 | Lu et al. ......................... 711/118 |
| 2006/0080398 | A1 | * | 4/2006 | Hoover et al. ................. 709/213 |
| 2006/0171236 | A1 | * | 8/2006 | Atwood et al. ........... 365/230.03 |
| 2008/0259694 | A1 | * | 10/2008 | Atwood et al. .......... 365/189.05 |
| 2009/0144506 | A1 | | 6/2009 | Barth, Jr. et al. |
| 2009/0222625 | A1 | * | 9/2009 | Ghosh et al. ................... 711/130 |
| 2009/0235035 | A1 | * | 9/2009 | Bacon et al. ................... 711/154 |

* cited by examiner

*Primary Examiner* — Sheng-Jen Tsai
(74) *Attorney, Agent, or Firm* — Fleit Gibbons Gutman Bongini & Bianco PL; Thomas Grzesik

(57) ABSTRACT

Various embodiments of the present invention manage access to a cache memory. In one embodiment, a set of cache bank availability vectors are generated based on a current set of cache access requests currently operating on a set of cache banks and at least a variable busy time of a cache memory includes the set of cache banks. The set of cache bank availability vectors indicate an availability of the set of cache banks. A set of cache access requests for accessing a set of given cache banks within the set of cache banks is received. At least one cache access request in the set of cache access requests is selected to access a given cache bank based on the a cache bank availability vectors associated with the given cache bank and the set of access request parameters associated with the at least one cache access that has been selected.

20 Claims, 20 Drawing Sheets

1702 ⟶ bank_available_store_vector(bank_id)<=(store data busy counter(bank_id)=0) AND
                                   (store block fetch counter(bank_id)=0) AND
                                   NOT(2_refresh_in_prog(bank_id) AND (fetch busy counter(bank_id)<(2*busy_val-8)))

1704 ⟶ bank_available_fetch_vector(bank_id)<=(fetch_busy_counter(ban_id)=0) AND
                                   (refresh_request(bank_id)=0)    AND
                                   (store block fetch counter(bank_id)=0)

1706 ⟶ refresh_grant(bank_id)<=((fetch busy counter(bank_id)=0) OR (fetch busy counter(bank_id) > busy_val)) AND
                       (
                       ((refresh_request(bank_id)=1) AND (store block fetch counter(bank_id)=0)) OR
                       ( (refresh_request(bank_id)=2) AND (store block fetch counter(bank_id)=0) AND
                         (((store data busy counter(bank_id) + (2*busy_val)) < str_data_done(bank_id)))
                       )
                       )

1708 ⟶ str_data_done(bank_id)<=8 WHEN 8_beat_store_in_prog(bank_id)=1 ELSE 16

CACHE BANK MODELING WITH VARIABLE ACCESS AND BUSY TIMES

FIELD OF THE INVENTION

The present invention generally relates to microprocessors, and more particularly relates to high performance caches.

BACKGROUND OF THE INVENTION

Current designs for a large cache that comprises many individual instances of Embedded Dynamic Random Access Memory (EDRAM) macros generally pose problems that were not encountered by prior Static Random Access Memory (SRAM) based designs. In particular, EDRAM devices have programmable performance parameters such as access time and busy time that are used to balance manufacturing yield with improved performance. While the ability to vary these parameters provides operational flexibility, this ability results in additional complexity with regard to modeling the availability of the cache resources. However, current designs generally do not take into account these programmable performance parameters, which results in inefficient utilization of cache resources.

SUMMARY OF THE INVENTION

In one embodiment, a method for managing access to a cache memory is disclosed. The method comprises generating a set of cache bank availability vectors based on a current set of cache access requests currently operating on a set of cache banks and at least a variable busy time of a cache memory comprising the set of cache banks. The set of cache bank availability vectors indicate an availability of the set of cache banks. A set of cache access requests for accessing a set of given cache banks within the set of cache banks is received. At least one cache access request in the set of cache access requests is selected to access a given cache bank in the set of cache banks based on the a cache bank availability vectors associated with the given cache bank and the set of access request parameters associated with the at least one cache access that has been selected.

In another embodiment, an information processing device for managing access to a cache memory is disclosed. The information processing device comprises at least one processor and at least one cache memory that is communicatively coupled to the at least one processing core. At least one cache controller is communicatively coupled to the at least one cache memory and the plurality of processing cores. The at least one cache controller comprises a cache bank availability modeler that is configured to perform a method comprising generating a set of cache bank availability vectors based on a current set of cache access requests currently operating on a set of cache banks and at least a variable busy time of a cache memory comprising the set of cache banks. The set of cache bank availability vectors indicate an availability of the set of cache banks. The cache controller also comprises a pipe request filtering module configured to perform a method comprising receiving a set of cache access requests for accessing a set of given cache banks within the set of cache banks. At least one cache access request in the set of cache access requests is selected to access a given cache bank in the set of cache banks based on the a cache bank availability vectors associated with the given cache bank and the set of access request parameters associated with the at least one cache access that has been selected.

In yet another embodiment, a tangible computer program product for managing access to a cache memory is disclosed. The computer program product comprises a storage medium readable by a processing circuit and storing instructions for execution by the processing circuit for performing a method. The method comprises generating a set of cache bank availability vectors based on a current set of cache access requests currently operating on a set of cache banks and at least a variable busy time of a cache memory comprising the set of cache banks. The set of cache bank availability vectors indicate an availability of the set of cache banks. A set of cache access requests for accessing a set of given cache banks within the set of cache banks is received. At least one cache access request in the set of cache access requests is selected to access a given cache bank in the set of cache banks based on the a cache bank availability vectors associated with the given cache bank and the set of access request parameters associated with the at least one cache access that has been selected.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 17 shows examples of how a cache bank availability modeler determines when a cache bank is available for a given access request according to one embodiment of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application can include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
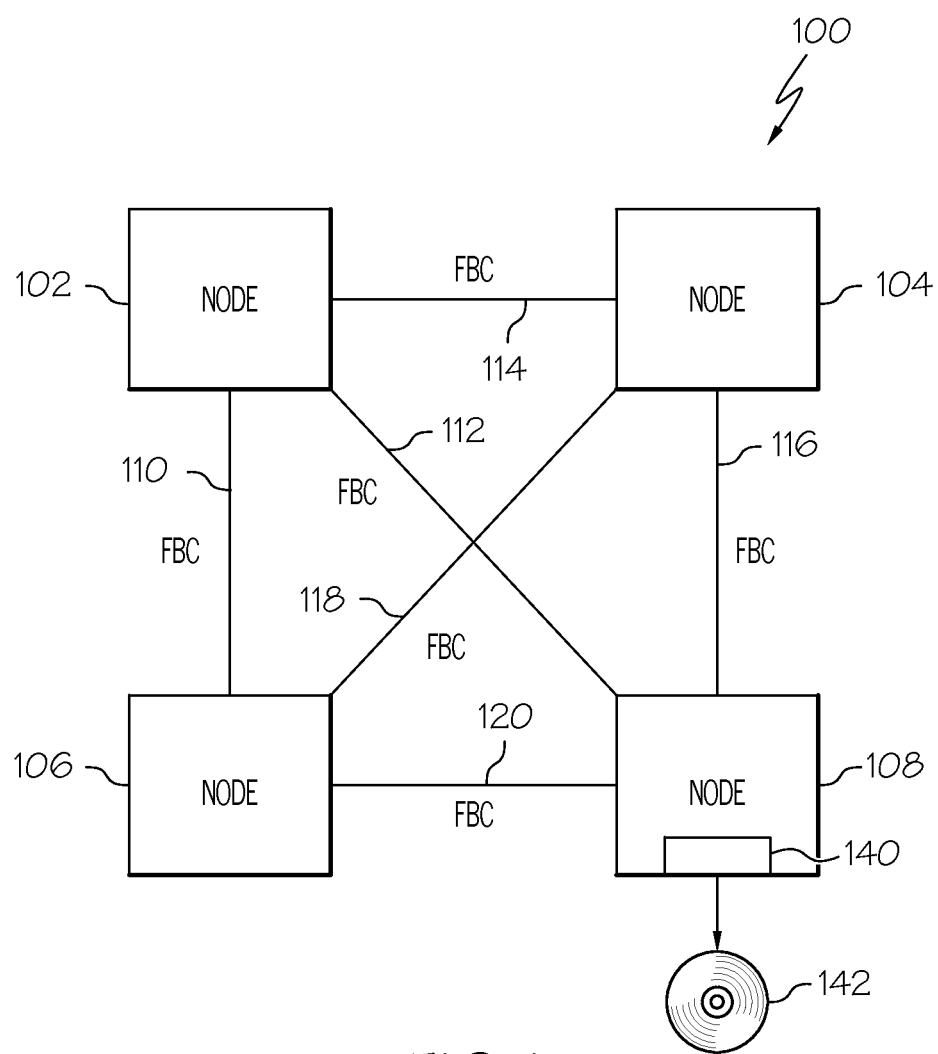
FIG. 1 is a block diagram illustrating one example of a computing system according to one embodiment of the present invention.
Figure 2:
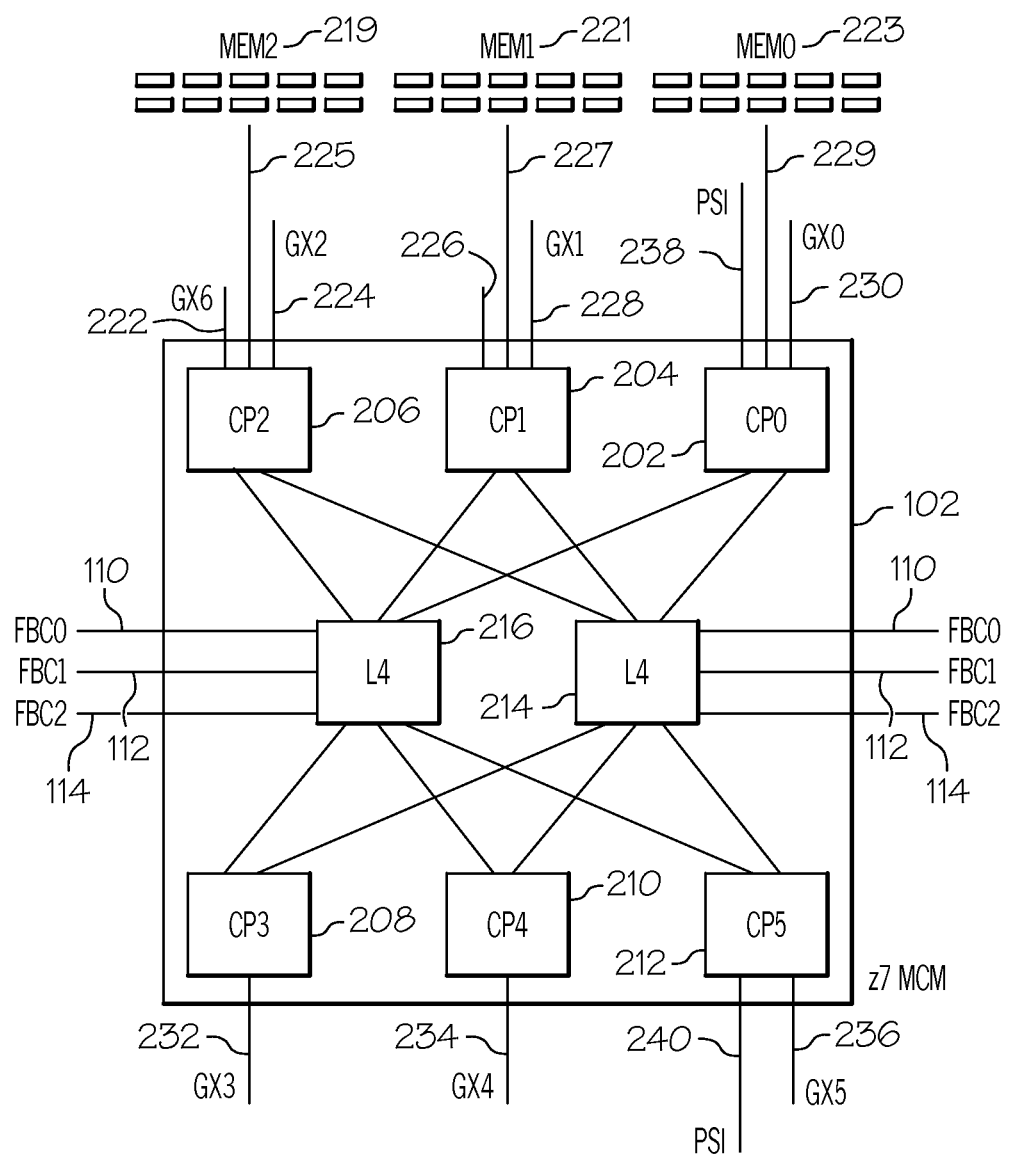
FIG. 2 is a block diagram illustrating one example of a computing node within the computing system of FIG. 1 according to one embodiment of the present invention.
Figure 3:
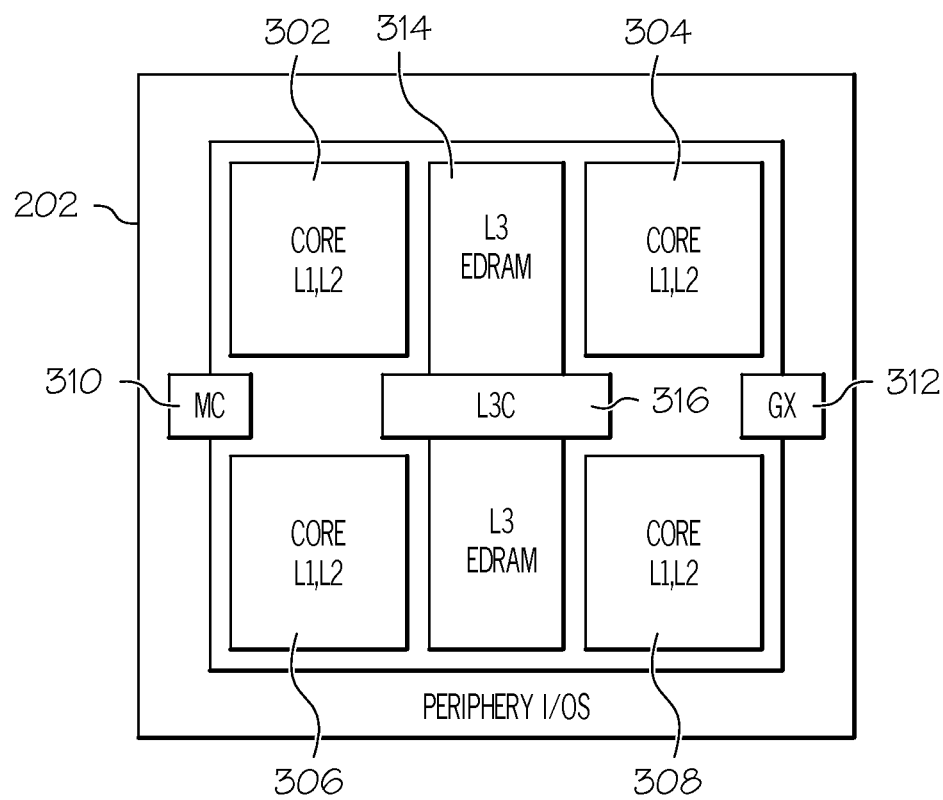
FIG. 3 is a block diagram illustrating one example of a processing chip comprising an L3 cache within the node of FIG. 1 according to one embodiment of the present invention.

FIGS. 1-3 show one example of an operating environment applicable to various embodiments of the present invention. In particular, FIG. 1 shows a computing system 100 that comprises a plurality of computing nodes 102, 104, 106, 108. Each of these computing nodes 102, 104, 106, 108 are communicatively coupled to each other via one or more communication fabrics 110, 112, 114, 116, 118, 120. Communication fabric includes wired, fiber optic, and wireless communication connected by one or more switching devices and port for redirecting data between computing nodes. Shown on node 108 is a storage medium interface 140 along with a computer readable store medium 142 as will be discussed in more detail below. Each node, in one embodiment, comprises a plurality of processors 202, 204, 206, 208, 210, 212, as shown in FIG. 2. Each of the processors 202, 204, 206, 208, 201, 212 is communicatively coupled to one or more lower level caches 214, 216 such as an L4 cache, which in one embodiment is an EDRAM cache. Each lower level cache 214, 216 is communicatively coupled to the communication fabrics 110, 112, 114 associated with that node as shown in FIG. 1. It should be noted that even though two lower level caches 214, 216 are shown these two lower level caches 214, 216, in one embodiment, are logically a single cache.

A set of the processors 202, 204, 206 are communicatively coupled to one or more physical memories 219, 221, 223 via a memory port 218, 220, and 222. Each processor 204, 206, 208, 210, 212 comprises one or more input/output ports 222, 224, 226, 228, 230, 232, 234, 236. One or more of the processors 202, 212 also comprise service code ports 238, 240 Each processor 204, 206, 208, 210, 212, in one embodiment, also comprises a plurality of processing cores 302, 304, 308 with higher level caches such as L1 and L2 caches, as shown in FIG. 3. A memory controller 310 in a processor 202 communicates with the memory ports 218, 220, 222 to obtain data from the physical memories 219, 221, 223. An I/O controller 312 controls sending and receiving on the I/O ports 222, 224, 226, 228, 230, 232, 234, and 236. A processor 202 on a node 102 also comprises at least one L3 EDRAM cache 314 that is controlled by a cache controller 316. In one embodiment, the L3 EDRAM cache 314 and the L4 cache 214, 216 are shared by all processing cores in the system 100.

L4 EDRAM Cache Bank Modeling with Variable Access and Busy Times

Figure 4:
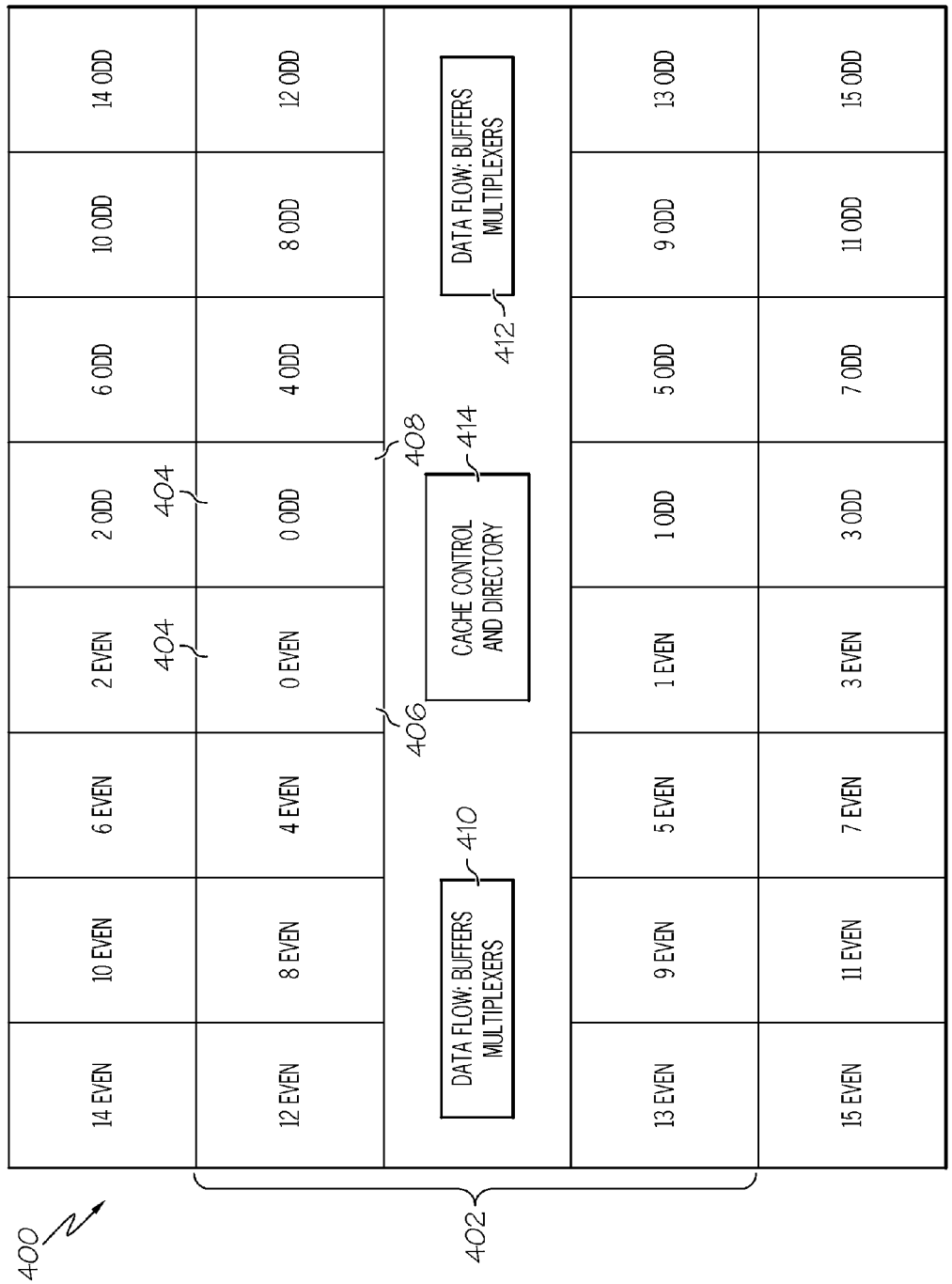
FIG. 4 is a block diagram illustrating one example of a processing chip comprising an L4 cache within the node of FIG. 1 according to one embodiment of the present invention.

In one embodiment, the L4 cache 314 is comprised of 2 SC chips, 214 and 216. FIG. 4 shows one of these chips 400. Each chip 400 comprises 768 EDRAM macros divided into 4 quadrants, or 4 L4Q instances, of 192 EDRAM macros per instance. Each L4Q instance is further divided into 8 banks of 24 EDRAM macros per bank. However, two quads are logically grouped together resulting in 16 banks 402 per one logically combined set of quads as shown in FIG. 4. FIG. 4 also shows that each bank 404 has been physically divided into two halves 406, 408, an even half 406 and an odd half 408. Each half 406, 408 has 8 bytes coming in and 8 bytes coming out for a total of 16 bytes. In other words, the chip 400 is divided with an even data flow on one side and an odd data flow on the other side. Data to and from the cache 214 goes into a data flow 410, 412, which comprises buffers and multiplexers, among other things. The chip 400 also comprises a cache controller that controls access to the cache 216 and a cache directory. The cache controller 214 is discussed in greater detail below.

Each L4Q instances is designated as L4Q[0:1][E,O], where 0 vs. 1 indicates top vs. bottom and E vs. O indicates even doublewords vs. odd doublewords. The top 2 L4Q instances together comprise a single logical cache and the bottom 2 L4Q instances together form another logical cache. A line (256 bytes) from memory is cached in the top or bottom cache depending on the value of absolute address bit 54. All the even doublewords (address bit 60='0') of any line are stored in an even L4Q instance and all the odd doublewords (address bit 60='1') of any line are stored in an odd L4Q instance.

Each EDRAM macro has a memory capacity of 1 Mb, logically organized as 1K rows of 8 compartments with 144 bits per compartment. A single line of cache (256 bytes of data plus 32 bytes of ECC) exists in 1 compartment of 1 row of 16 EDRAM macros (8 EDRAM macros in an even L4Q instance and 8 EDRAMs in an odd L4Q instance. There are 8 ECC bits for every doubleword in a line. Every doubleword of a line is striped across 8 EDRAM macros at 9 bits per EDRAM macro (8×9 bits=72 bits=8 bytes plus 8 ECC bits). Internally, an EDRAM macro reads 144 bits per access and writes 144 bits (optionally 72 bits) per access. The 144 bits of read data is output at 9 bits per cycle for 16 cycles (or 8 for half line reads) following an access. Store data is accumulated internally at 9 bits per cycle for 8 or 16 cycles prior to a write access. Read accesses can begin on any quadword boundary and wrap on a 256 byte boundary. Write accesses begin on a 128 byte boundary and do not wrap.

Figure 5:
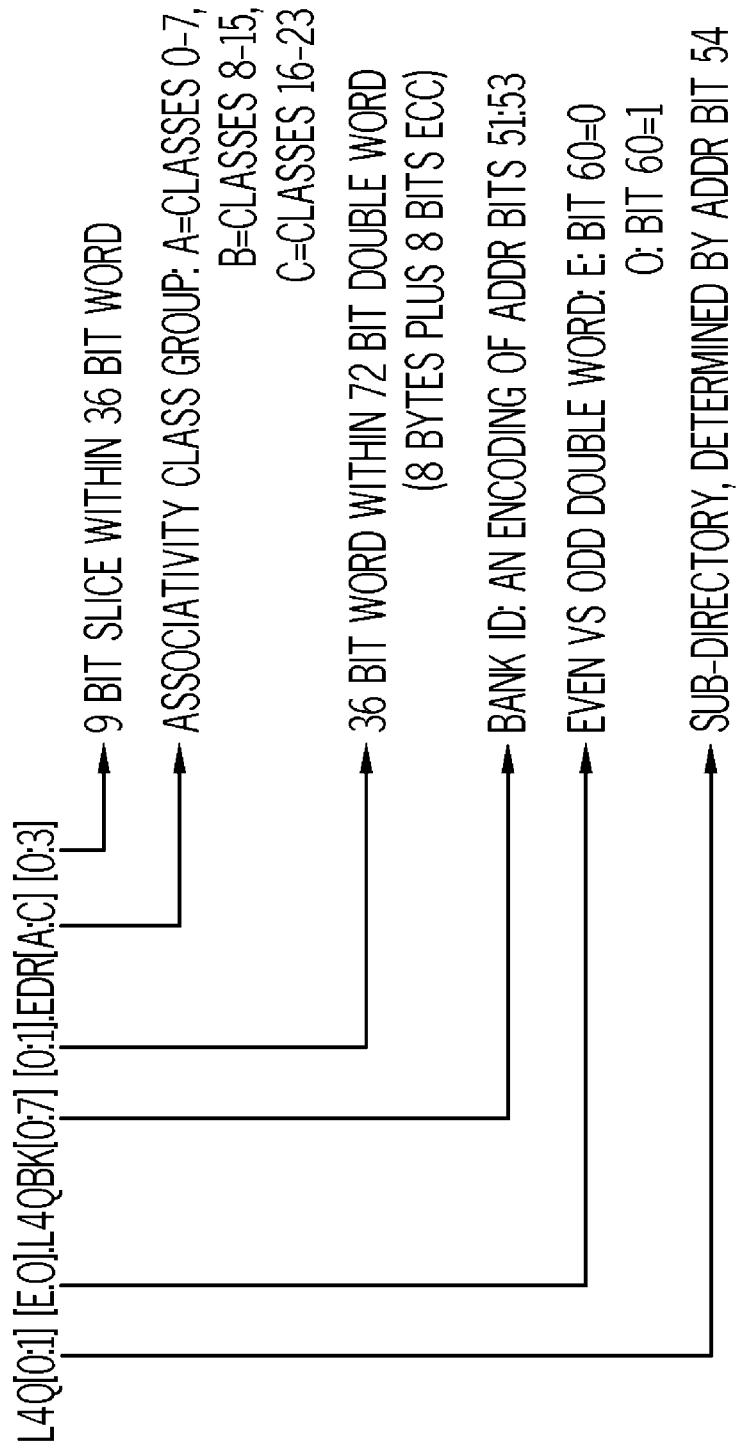
FIG. 5 shows a representation of EDRAM instance names according to one embodiment of the present invention.

Instance names of EDRAMs or groups of EDRAMs are determined (mostly) by address and associativity class. The L4 cache 214 is 24-way set associative, since the EDRAMs have only 8 compartments, it takes 3 groups of EDRAMs for each address range in order to implement the 24 associativity classes. The EDRAM instance names are represented and defined as shown in FIG. 5. For any given full cache line access (read or write) there are 16 beats (cycles) of data, where each beat contains 1 quad word (16 bytes plus two 8 bit ECC fields) within the line as determined by address bits 56:59.

Data is organized in the cache 214 as shown in Table 1 below.

TABLE 1

| Addr Bits | Used to select: |
| --- | --- |
| 51:53 | 1 of 8 banks of eDRAMs in an L4Q instance |
| 41:50 | 1 of 1K row addresses within eDRAM macros (49:50) actually select 1 of 4 subarrays within an eDRAM macro, each or which has 256 rows) |
| 54 | Top versus Bottom cache on an SC chip |
| 55 | 1 of 2 SC chips |
| 56:59 | Starting Quadword |
| 60 | Even versus Odd doubleword |
| Directory hit bits: | 0:7 are late selects for 8 (row a) of 24 eDRAMs in a bank |
| | 8:15 are late selects for 8 (row b) of 24 eDRAMs in a bank |
| | 16:23 are late selects for 8 (row c) of 24 eDRAMs in a bank |

Figure 6:
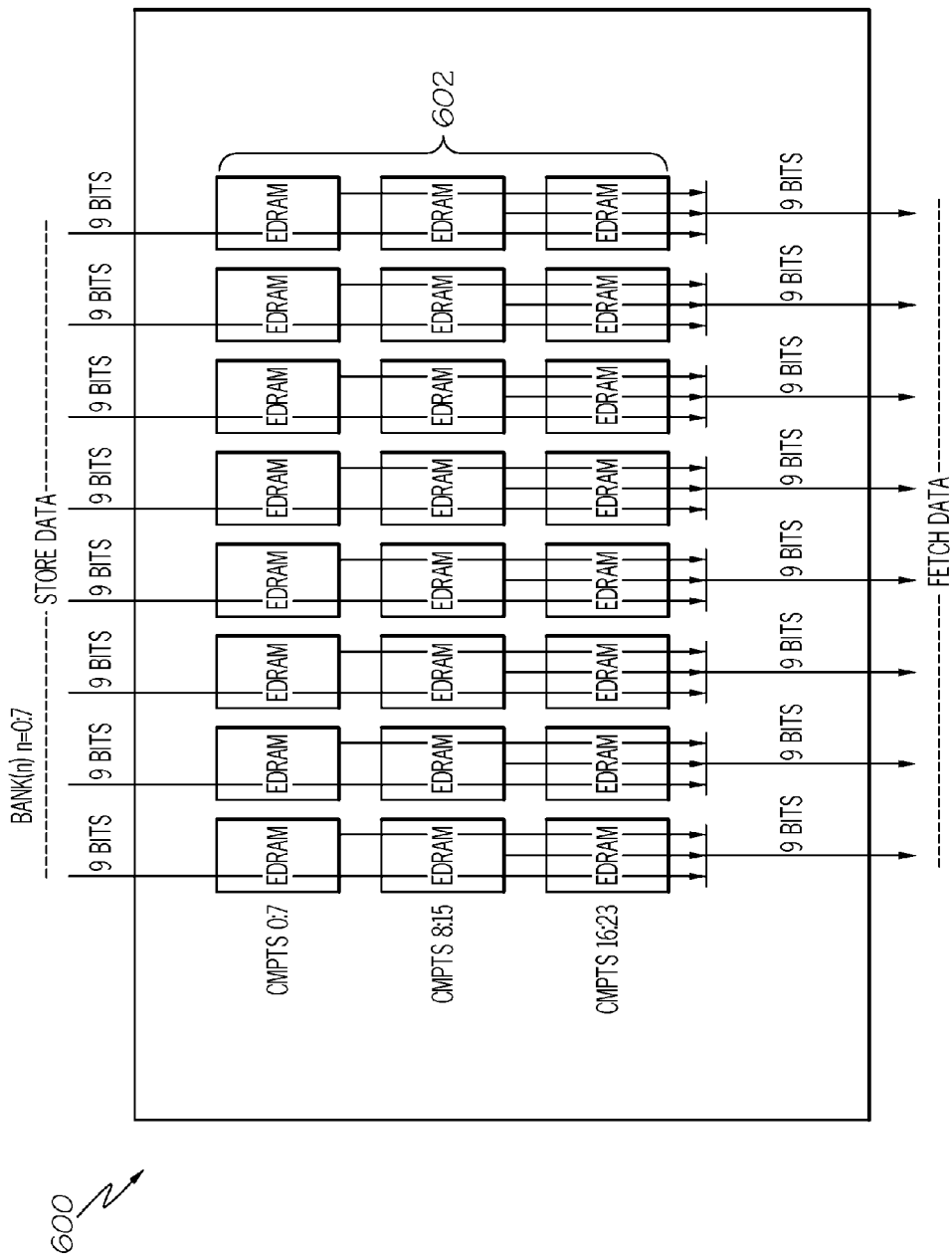
FIG. 6 illustrates a logical representation of one cache bank according to one embodiment of the present invention.
Figure 7:
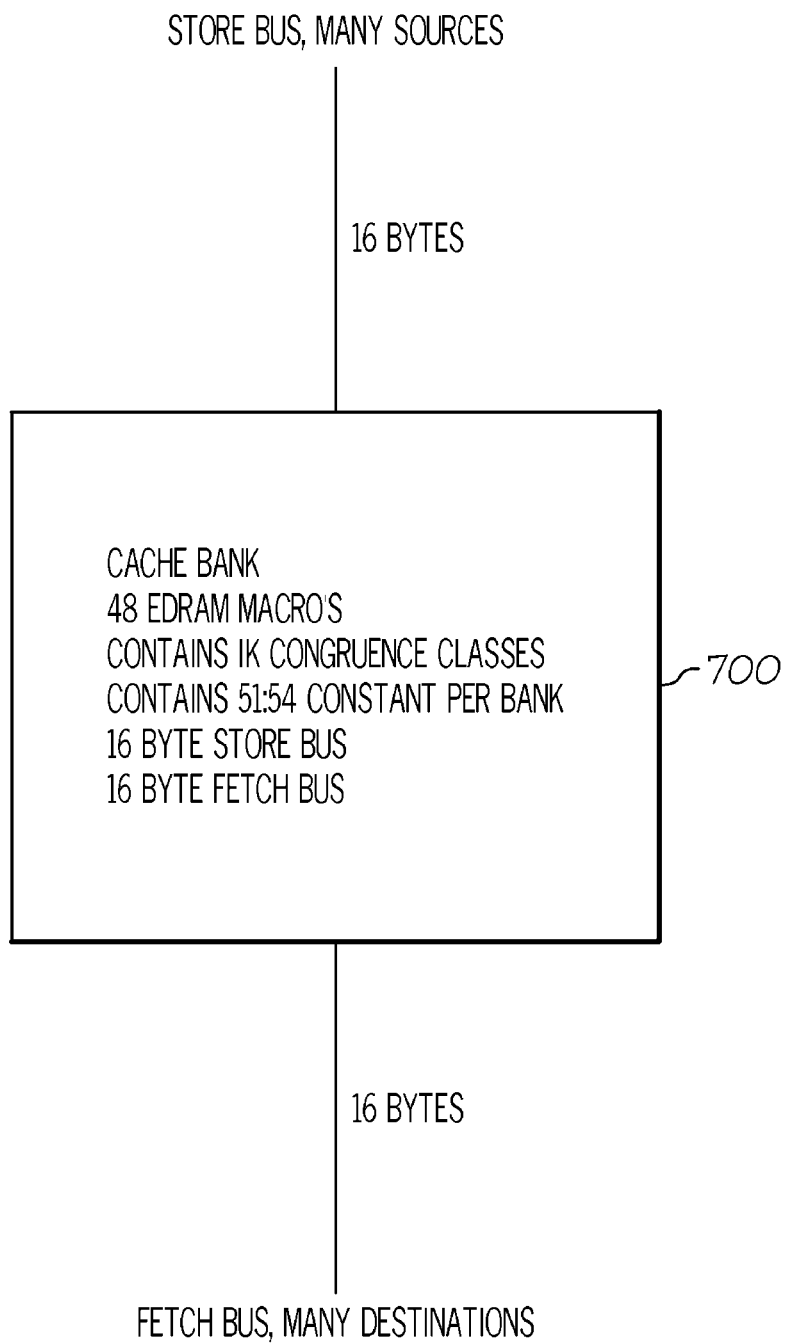
FIG. 7 illustrates another representation of one cache bank according to one embodiment of the present invention.
Figure 8:
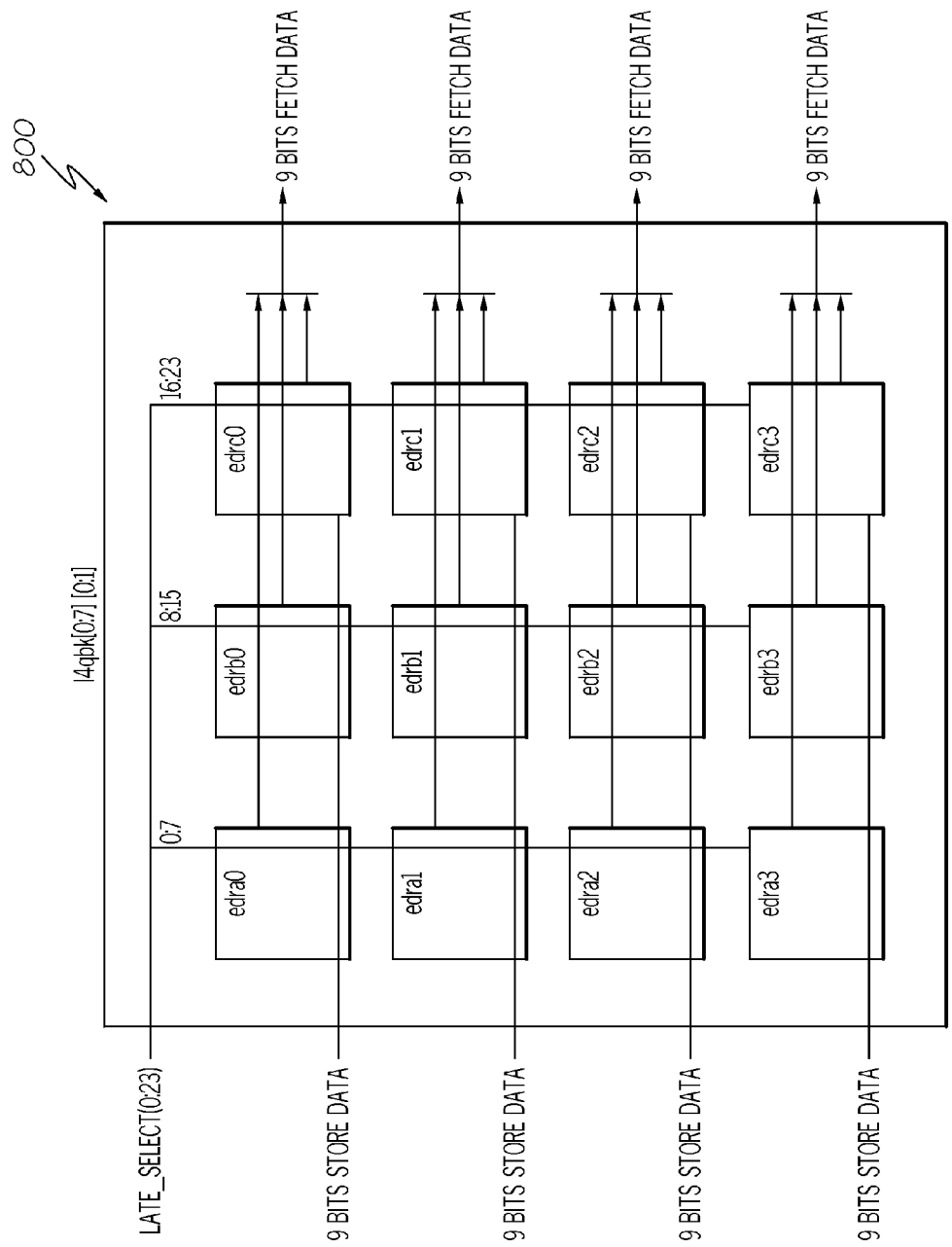
FIG. 8 shows the cache bank of FIG. 6 divided into two half banks of 12 EDRAM macros that are instantiated with a common VHDL soft wrapper according to one embodiment of the present invention.

FIG. 6 shows a logical representation of one cache bank 600. Each bank in an L4Q instance is comprised of 24 EDRAM macros 602, logically organized as 3 rows of 8 macros. However, it should be noted that when 2 quads are logically combined, as discussed above, each bank 700 comprises 48 macros (as shown in FIG. 7). Row selection for read or write access is based on compartment. The cache is 24-way set associative, while the EDRAM macros have 8 compartments, allowing each row of macros to supply 8 of the compartments. The data path into and out of a bank is 72 bits (8 bytes wide with 8 ECC bits). For any access, a single row of EDRAMs consumes or supplies the 72 bit data bus in or out. For ease of implementation, the banks are divided into two half banks of 12 EDRAM macros that are instantiated with a common VHDL soft wrapper, as shown in FIG. 8. Each half bank 800 is 3 rows of 4 EDRAMs and it connects to 36 of the 72 bit store and fetch buses. Instance names within an L4Q instance are: 14qbk[0:7][0:1] where the 0:7 digit indicates the bank, and the 0:1 digit indicates high or low word within the bank. EDRAM instances within a soft macro are named: edr[a:c][0:3] where a:c indicates the row or compartment range with a=cmpts 0:7, b=cmpts 8:15, and c=cmpts 16:23. The 0:3 digit in the EDRAM instance name indicates the 9 bit slice within a half doubleword. It should be noted, that two quads can be logically combined, as discussed above. Therefore, a cache bank logically comprises 48 EDRAM macros as shown in FIG. 7.

As discussed above, EDRAM devices such as the L4 cache 214 have programmable performance parameters such as access time and busy time that are used to balance manufacturing yield with improved performance. However, conventional EDAM designs generally do not take into account these programmable performance parameters. Therefore, the L4 cache 214 of various embodiments of the present invention utilizes a centralized bank model that tracks the usage of address sliced cache resources by current operations and provides two bits vectors to indicate bank availability for both fetch and store operations for every bank in the L4 cache 214. These bit vectors are used to filter cache requests for a large number, e.g., approximately 100, controllers per cache chip, suppressing the requests of any controller requiring access to a bank that is not available for the requested access type. The usage of each bank's resources is modeled with counters and shift registers. These resources include fetch and store data buses, and the ability of the EDRAM macros comprising the bank to accept a new command. The values these counters and shift registers are compared to are varied based on system wide settings that also control the performance parameter inputs to all of the EDRAMs in the L4 cache 214. This allows for accurate and efficient modeling of the cache resource usage, in turn allowing for pipeline packing or back-to-back cache accesses, across the entire range of EDRAM performance settings.

Figure 9:
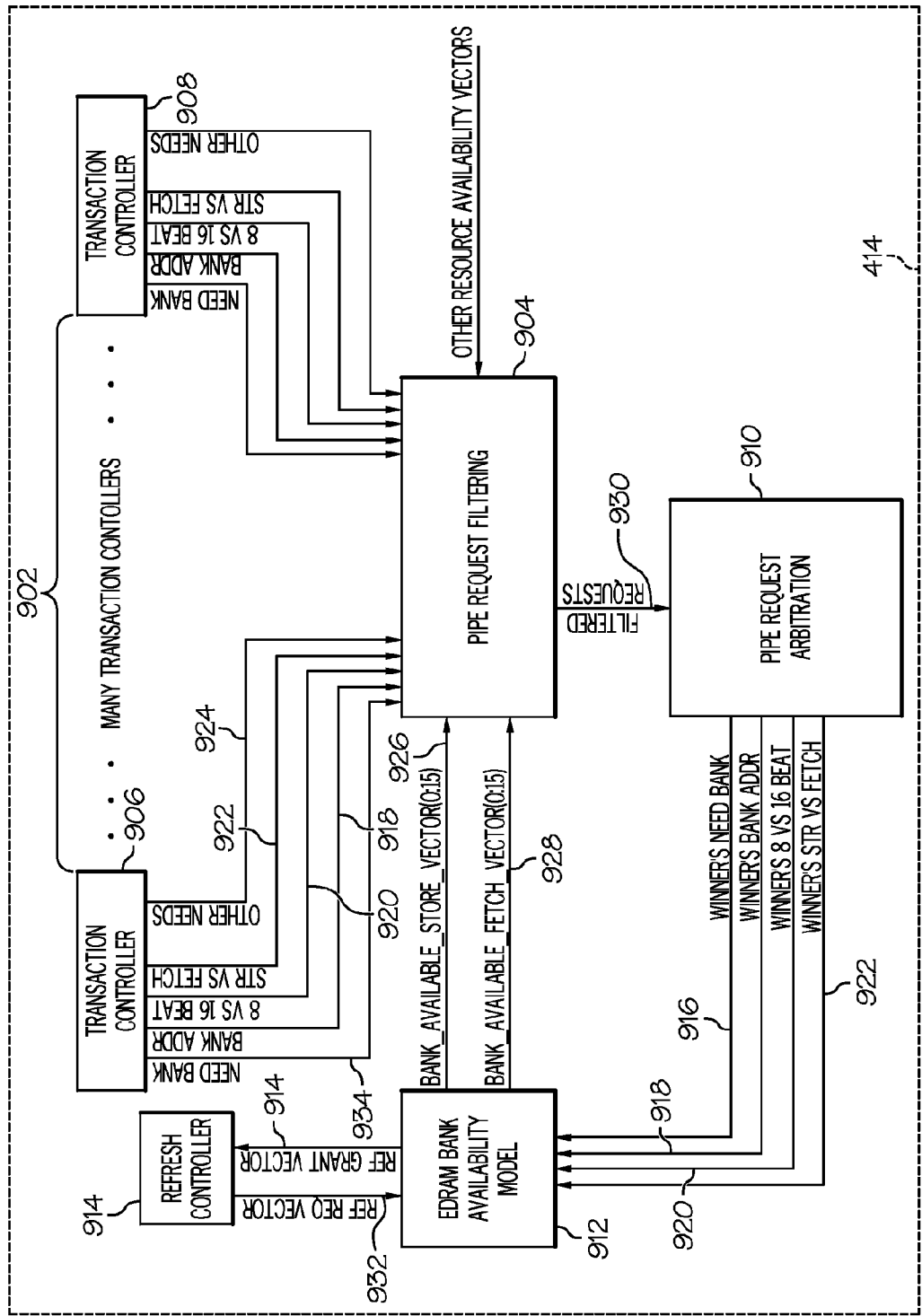
FIG. 9 is a block diagram illustrating an L4 cache controller according to one embodiment of the present invention.

FIG. 9 shows a more detailed view of the L4 cache controller 414 for modeling the cache resource usage. In particular, FIG. 9 shows that a plurality of transaction controllers 902 is communicatively coupled to a pipe request filtering module 904. Transaction controllers 906, 908 compete for access to the cache transaction pipeline. Different types of transactions have different resource requirements for successful completion of a pipe pass. A multilevel pipe request arbitration module 910 and EDRAM bank availability modeler 912 are also communicatively coupled to the pipe request filtering module 904. The pipe request filtering module 904 filters requests based on the availability of the resources they require and the information from the EDRAM bank availability modeler 912. The pipe request arbitration module 910 selects a filtered request for entry into the transaction pipeline for every cycle there is an active filtered request. FIG. 9 also shows that a refresh controller 914 is communicatively coupled to the EDRAM bank availability modeler 912.

When the chip 400 receives a request from a node 102 to access a cache line the request is assigned to one of the transaction controllers 906. The transaction controller 906 sends an indication ("need bank") 916 to the pipe request filtering module 904 that it requires a bank 700. The transaction controller 906 also indicates which particular bank ("bank addr") 918 it requires. The controller 906 further indicates whether the requested operation is an 8 beat or 16 beat operation ("8 vs. 16 beat") 920. The controller 906 also indicates whether the operation is a store or a fetch operation ("str vs. fetch") 922. The controller 906 also notifies the pipe request filtering module 904 of any other resource requirements ("other needs") 922 that it needs. This information is received by the pipe request filtering module 904. The pipe request filtering module 904 receives vectors 926, 928 from the EDRAM bank availability modeler that indicate which resources are currently available for the current cycle. In one embodiment, there are separate 16 bit (one bit for each of the 16 banks) vectors 926, 928 for store and fetch operations. It should be noted that the pipe request filtering module 904 can also receive other resource availability vectors 929 as well. Based on the received vector(s) 926, 928, the pipe request filtering module 904 selects a set of requests and sends these selected/filtered requests 930 to the pipe request arbitration model 910. The pipe request arbitration model 910 performs arbitration logic on the received requests 930 to select a "winning" request. The pipe request arbitration module 910 then sends the information associated with the "winning" request, e.g., "need bank" 916, "bank addr" 918, "8 vs. 16 beat" 920, and "str vs. fetch" 922 information, to bank availability modeler 912. The EDRAM bank availability modeler 912 then updates its bank models based on the received information, as is discussed in greater detail below.

With respect to the refresh controller 914, an on demand interface is provided. In this embodiment, the refresh controller 914 is addressed sliced by bank. The refresh controller 700 sends a refresh request vector 932 to the EDRAM bank availability modeler 912 that indicates how many commands it needs to perform. Based on current state of the models, the EDRAM bank availability modeler 912 either sends or does not send a refresh grant vector 934 to the refresh controller 914. The refresh controller 914 then performs its operations once it receives the refresh grant vector from the EDRAM bank availability modeler 912. The EDRAM bank availability modeler 912 then updates its models accordingly, as is discussed in greater detail below.

A more detailed discussion is now given with respect to modeling EDRAM bank availability. The bank modeler 912 tracks the cache resources needed for various operations at each cache bank 404 and for various programmable parameters such as access time and busy time. The access time is the number of cycles from the initiation of a fetch command until the delivery of fetch data from the L4 cache 214. The busy time is the number of cycles from the initiation of any command (fetch, store, or refresh) until the L4 cache 214 macro is available for a subsequent command.

Figure 10:
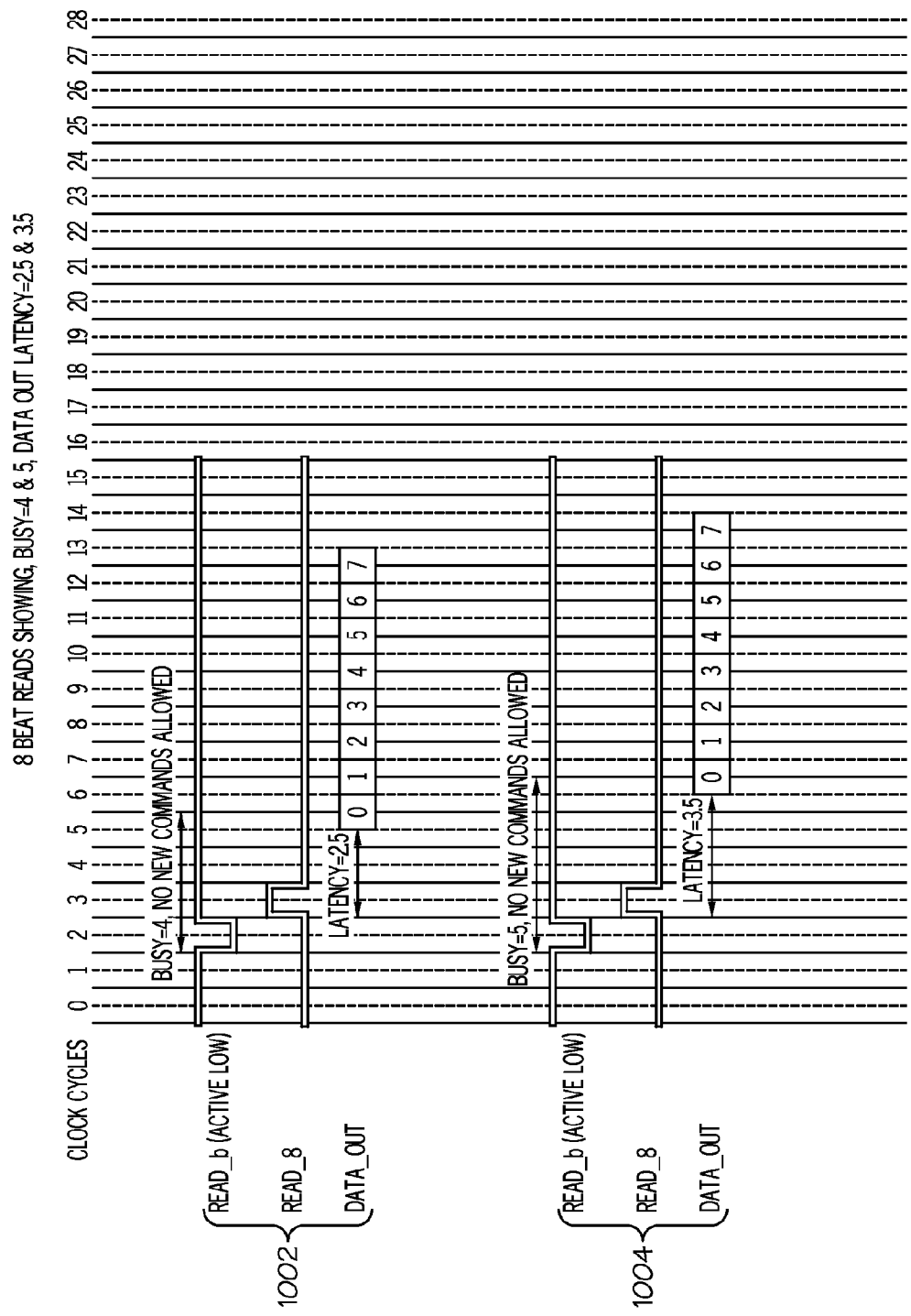
FIG. 10 shows timing diagrams for an 8 beat read with a busy time set to 4 cycles and a data latency set to 2.5 cycles and an 8 beat read with a busy time set to 5 cycles and a data latency set to 3.5 cycles, respectively, according to one embodiment of the present invention.

A refresh operation requires multiple cycles to complete, but no data transfer cycles. A fetch operation, which can either be an 8 beat or 16 beat operation, to a bank requires multiple cycles to execute the fetch command before fetch data is available, followed by multiple cycles of data delivery on the fetch bus dedicated to that bank. An example of this is shown in the timing diagram of FIG. 10. The timing diagrams of FIG. 10 shows an 8 beat 1002 read with a busy time of 4 cycles and a 2.5 cycle latency and an 8 beat read 1004 with a busy time of 5 cycles and a 3.5 cycle latency. The 4 cycle busy time with a 2.5 cycle latency and the 5 cycle busy time with a 3.5 cycle latency illustrate how the cache chip 400 comprises variable programmable performance parameters. It should be noted that these values are only examples and other values are applicable as well.

With respect to the 8 beat read 1002 with a busy time of 4 cycles and a 2.5 cycle latency, FIG. 10 shows that on clock cycle 2 the read operation is initiated. On the subsequent cycle, cycle 3, the EDRAM is instructed as to whether the operation is 8 beats or 16 beats (e.g., a programmable length). For example, if the read_8 signal is not active (is low), the operation is 16 beats and if the read_8 signal is active (is high), as shown in FIG. 10, the operation is 8 beats. The double headed arrow indicates that another operation cannot be started until 4 cycles from start of the 8 beat read operation since the busy time is set to 4 cycles in this example. Because there is a latency of 2.5 cycles in this example data delivery does not start until cycle 5.5. When the busy time is set to 5 cycles the read operation 1004 is initiated on clock cycle 2. On the subsequent cycle, cycle 3, the EDRAM is instructed as to whether the operation is 8 beats or 16 beats, as discussed above. The double headed arrow indicates that another operation cannot be started until 5 cycles from start of the 8 beat read operation since the busy time is set to 5 cycles in this example. Because there is a latency of 3.5 cycles in this example, data delivery does not start until cycle 6.5.

Figure 11:
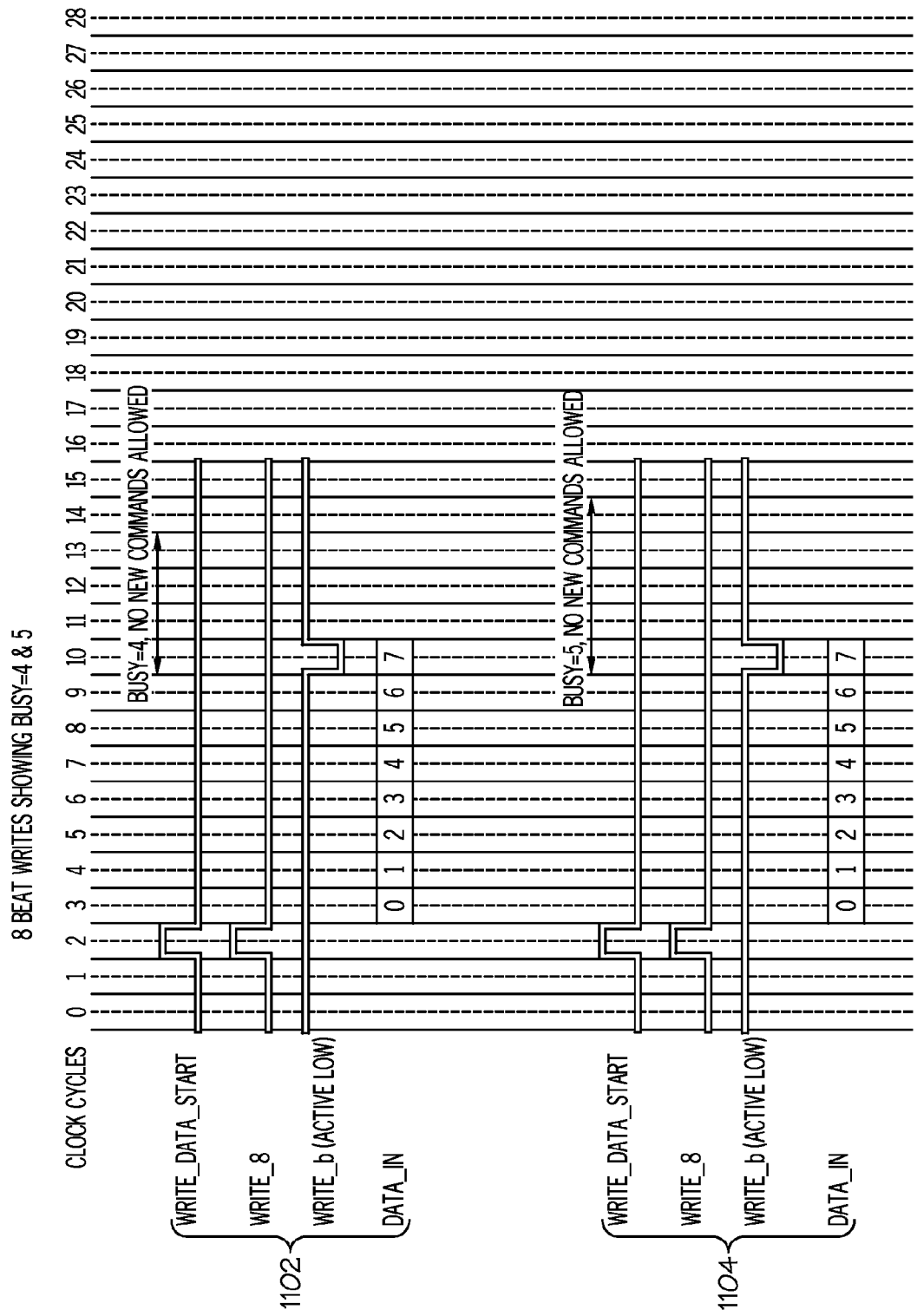
FIG. 11 shows timing diagrams for an 8 beat write with a busy time set to 4 cycles and an 8 beat write with a busy time set to 5, respectively, according to one embodiment of the present invention.

With respect to store operations, a store operation requires multiple cycles of data delivery on the store bus dedicated to the bank, followed by multiple cycles to execute the store command once all the data has been delivered. An example of this is shown in the timing diagram of FIG. 11. The timing diagrams of FIG. 11 shows an 8 beat write 1102 with a busy time of 4 cycles and an 8 beat write 1104 with a busy time of 5 cycles. With respect to an 8 beat store 1102 with a busy time of 4 cycles, FIG. 11 shows that on clock cycle 2 the store operation is initiated. On the same cycle, cycle 2, the EDRAM is instructed as to whether the operation is 8 beats or 16 beats. For the first 8 cycles of the operation data is being gathered for writing to the bank. Therefore, once the operation has accumulated the data on the last cycle (cycle 10 in this example) another operation cannot start for a window of 4 cycles since the busy time is set to 4 cycles in this example. In other words, once the writing of the accumulated data begins on cycle 10, another operation cannot start until cycle 14.

With respect to an 8 beat store 1104 with a busy time of 5 cycles, FIG. 11 shows that on clock cycle 2 the store operation is initiated. On the same cycle, cycle 2, the EDRAM is instructed as to whether the operation is 8 beats or 16 beats. For the first 8 cycles of the operation data is being gathered for writing to the bank. Therefore, once the operation has accumulated the data on the last cycle (cycle 10 in this example) another operation cannot start for a window of 5 cycles since the busy time is set to 5 cycles in this example. In other words, once the writing of the accumulated data begins on cycle 10, another operation cannot start until cycle 15.

Figure 12:
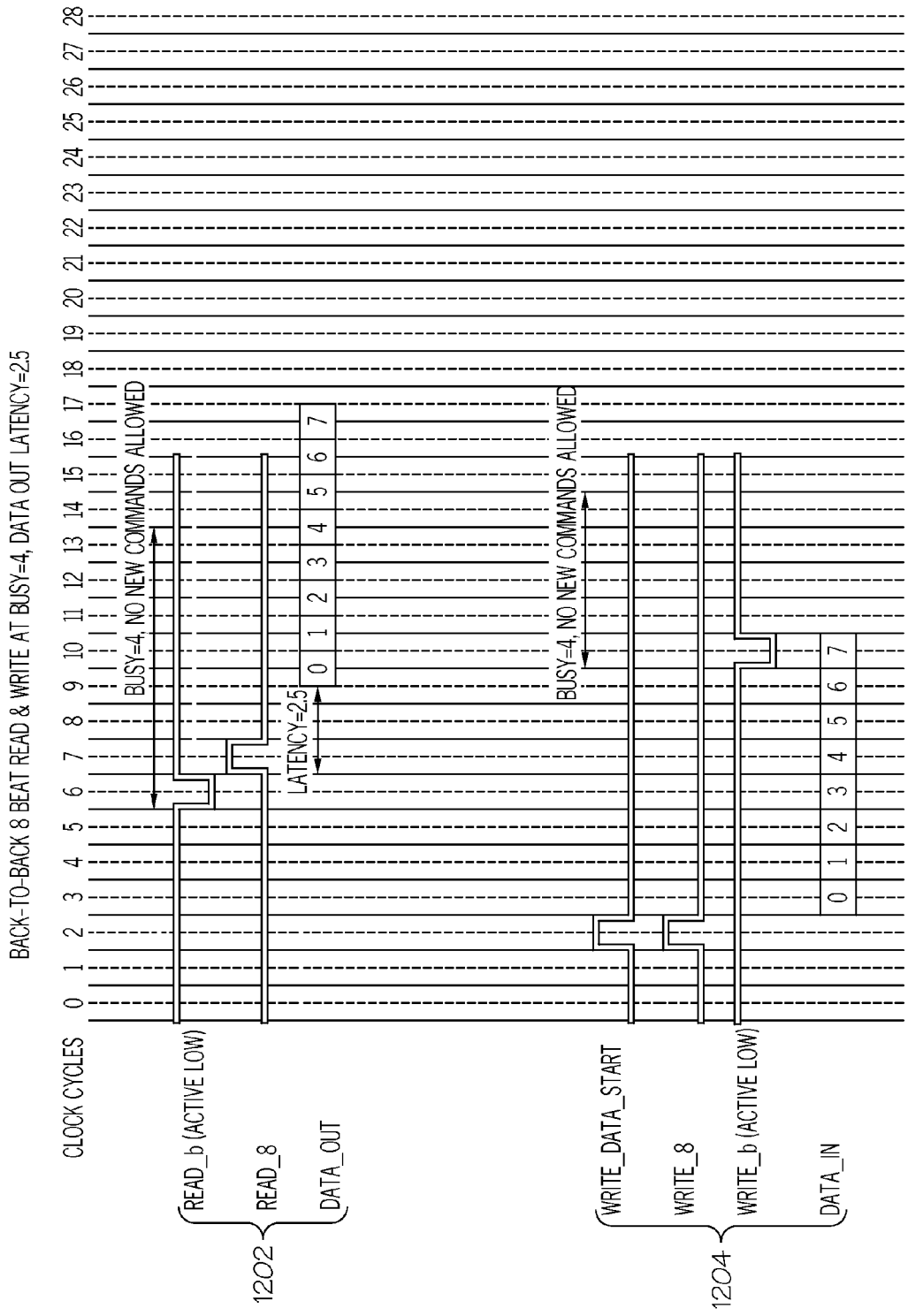
FIG. 12 shows timing diagrams for a back-to-back 8 beat read and 8 beat write with a busy time set to 4 cycles and a data latency set to 2.5 cycles according to one embodiment of the present invention.
Figure 13:
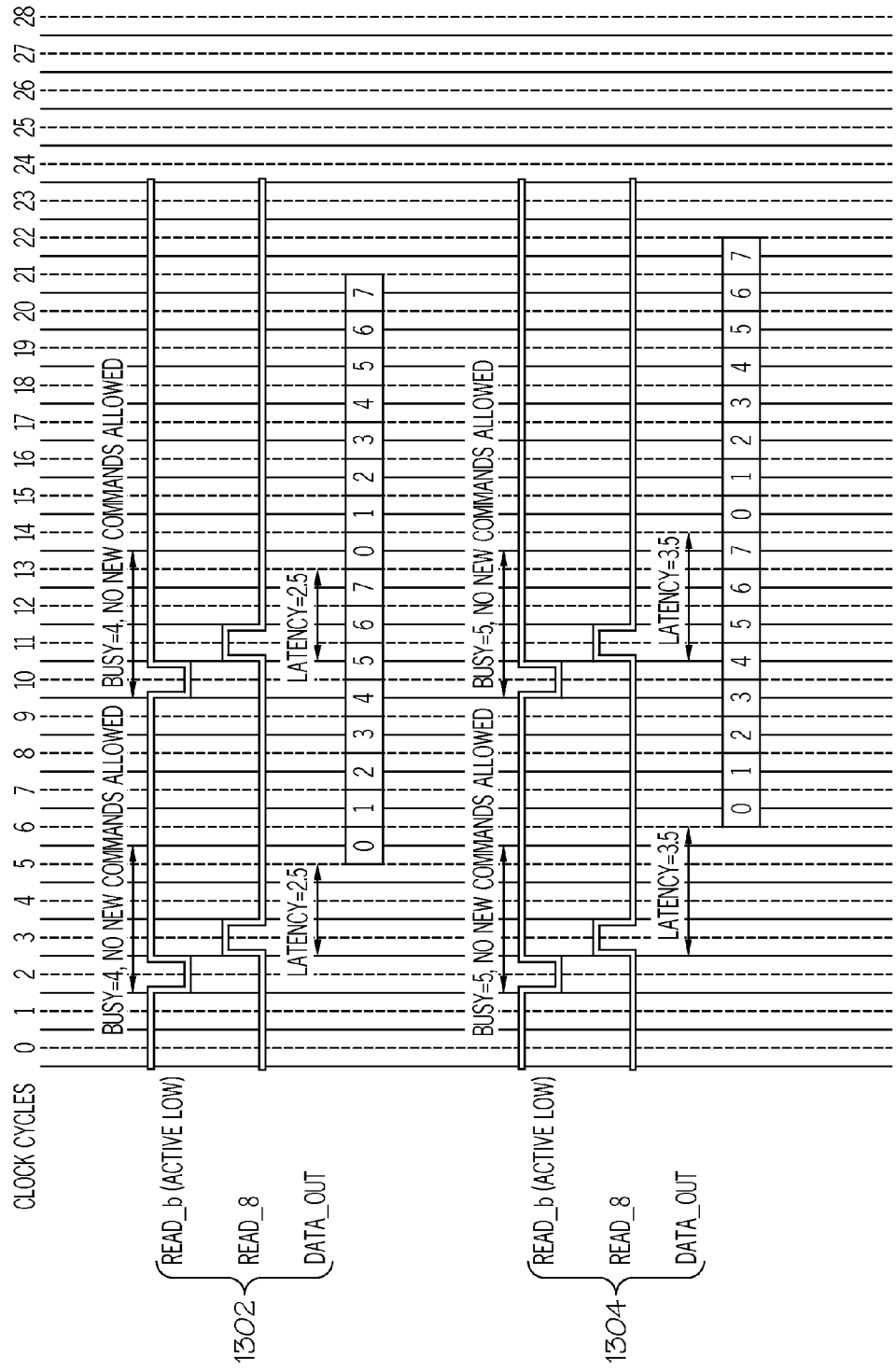
FIG. 13 shows timing diagrams for back-to-back 8 beat reads with a busy time set to 4 cycles and a data latency set to 2.5 cycles and back-to-back 8 beat reads with a busy time set to 5 cycles and a data latency set to 3.5 cycles, respectively, according to one embodiment of the present invention.
Figure 14:
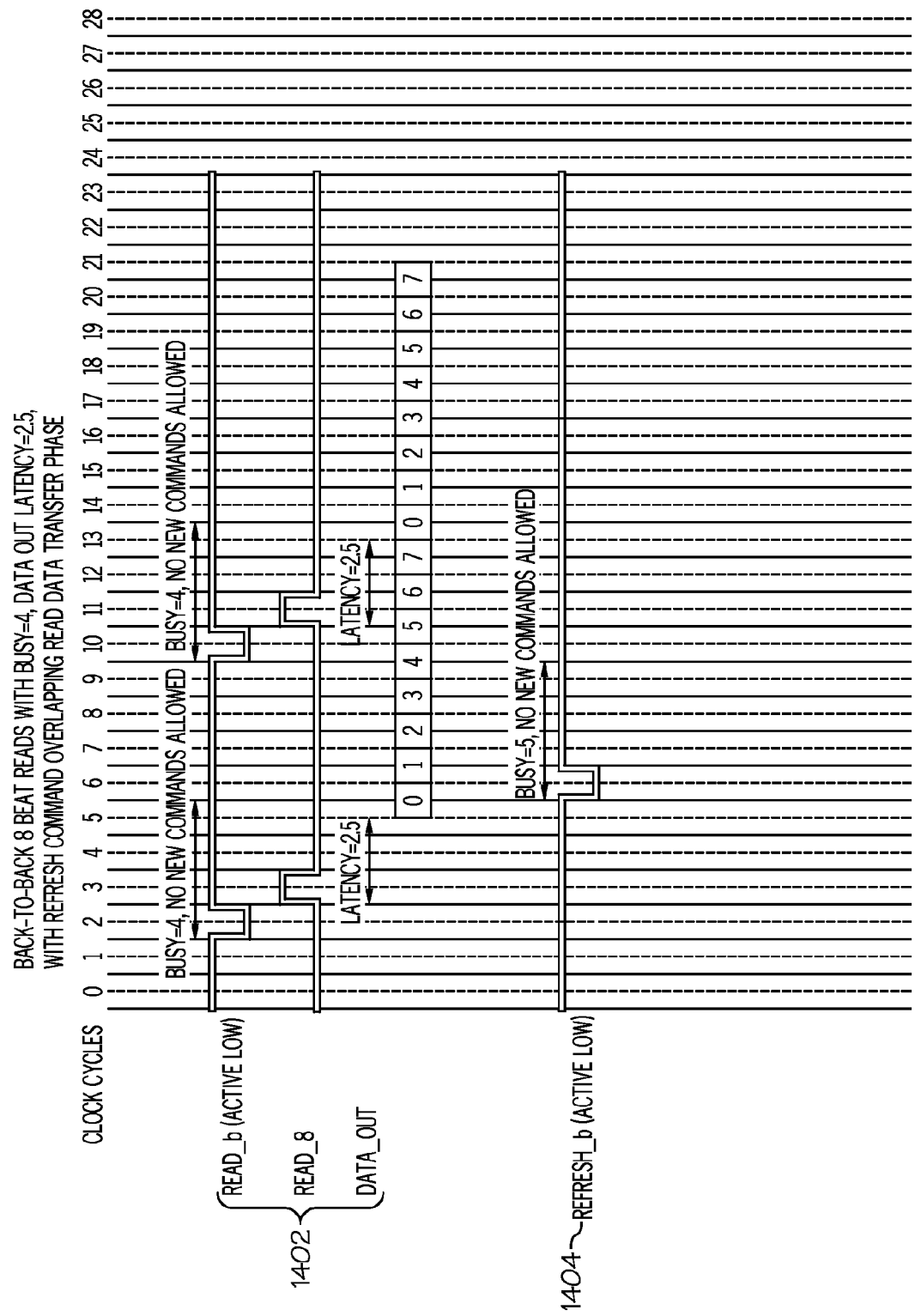
FIG. 14 shows timing diagrams for back-to-back 8 beat reads with a busy time set to 4 cycles and a data latency set to 2.5 cycles with a refresh command overlapping the read data transfer phase according to one embodiment of the present invention.

The EDRAM macros (and consequently the cache bank they comprise) are capable of simultaneously accumulating store data for one operation while delivering fetch data for a different operation. Likewise, the execution of the command phase of an operation (fetch, store, or refresh) can occur during the data transfer phase of a different operation. The execution of the command phase of any operation cannot be overlapped with the execution of the command phase of any other operation. For example, FIG. 12 shows a timing diagram for a back-to-back 8 beat read 1202 and write 1204 with busy=4 cycles and data out latency=2.5 cycles. As can be seen from FIG. 12, during the data accumulating stage (cycles 3 through 10) of the store operation 1204 the fetch operation 1202 is able to be performed. FIG. 13 shows examples of back-to-back 8 beat read operations 1302, 1304 with busy=4 and latency=2.5 and busy=5 and latency=3.5. As can be seen, the read_b portion of the back-to-back operations is separated by 8 cycles in both examples. FIG. 14 shows a timing diagram illustrating an example of back-to-back 8 beat read operations 1402 with busy=4 and latency=2.5 and a refresh command 1404 overlapping the read data transfer phase. It should be noted that if the busy time was set to 5 cycles in this example the refresh command could not be performed. The second read would have to be delayed to allow the refresh operation to be performed.

Based on the operations in progress (such as those given in the examples of FIGS. 10-14), the bank modeler 912 broadcasts a bank availability signal 926, 928 for fetch operations and also for store operations for every bank 404 in the cache 214. These availability vectors 926, 928 are used to filter requests for bank access by many cache controllers, each of which is dynamically dedicated to a single request on behalf of a microprocessor somewhere in the system. The bank modeler 912 takes the data access time into account when modeling the availability of the fetch data busses associated with each bank. For instance, a shorter data access means that a new fetch operation needs to wait closer to the end of a fetch operation in progress (at the same cache bank) before initiating the command to avoid data overlap on the fetch data bus. This is an example of just one interaction between current and prospective operations at a cache bank that are affected by variable access times and there are also other interactions as well.

Figure 15:
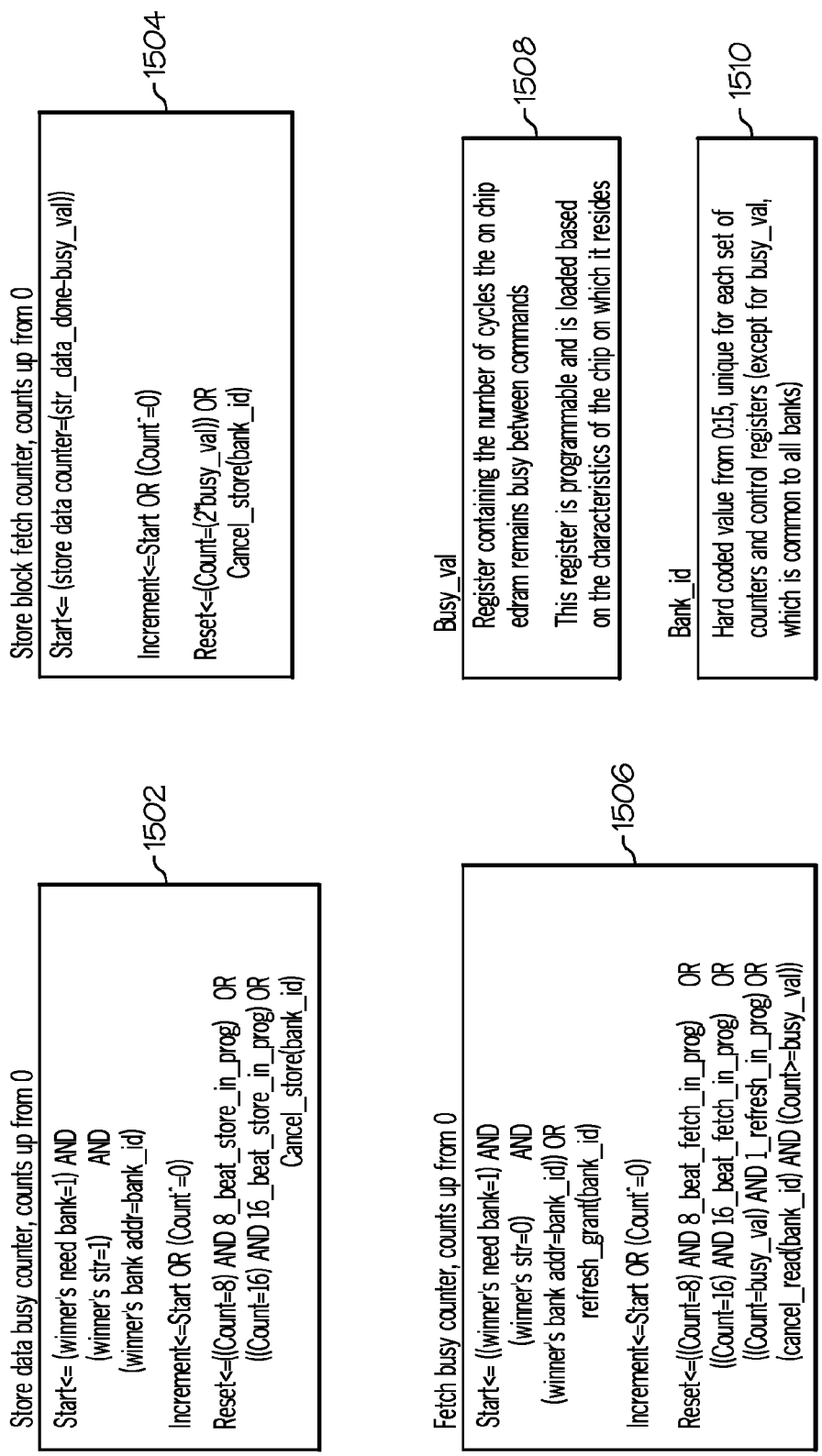
FIG. 15 shows a set of counters and registers used to model cache bank availability for variable busy and access times according to one embodiment of the present invention.

The bank modeler 912, in one embodiment, uses shift registers and counters to model the resource usage at a bank during the data delivery and command execution phases of all operations, as shown in FIG. 15. To accurately deal with these interactions, the counters that track fetch data bus usage are designed with variable starting times relative to the fetch command initiation to support the variable data access times of the EDRAM macros. In addition to access time, the bank modeler 912 also takes the busy time in to account when modeling the availability of a cache bank to accept a command (fetch, store, or refresh). For instance, a fetch operation can begin during the data accumulation phase of a store operation, provided that the execution of the command phase of the fetch operation completes prior to the initiation of the command phase of the store operation (the command phase of the store operation occurs at the end of the data accumulation phase). A longer busy time restricts the window (moves it earlier in time) in which fetch can begin while store data accumulation is in progress. This is an example of one interaction between current and prospective operations at a cache bank that are affected by variable busy times and there are also interactions as well. To accurately deal with these interactions, the counters that track EDRAM command execution are designed with variable durations to support the variable busy times of the EDRAM macros.

FIG. 15 shows examples of the registers and counters discussed above. It should be noted that, in one embodiment, there are 16 sets of these registers in the modeler 912, one for each of the 16 banks on the L4 cache chip 400 with the exception of the "Busy_val" register, which is common to all banks. As can be seen from FIG. 15, the model comprises a store data busy counter 1502 that counts up from 0, an operation block counter 1504 that counts up from 0, a fetch busy counter 1506 that counts up from 0, a Busy_val register 1508, and a Bank_id 1510. The Busy_val register 1508 comprises the number of cycles, e.g., 4 or 5 cycles, the L4 cache 214 remains busy between commands. This register is programmable and is loaded based on the characteristics of the chip on which it resides. The Bank_id 1510 is a hard coded value from 0:15 and is unique for each set of counters and control registers except for the Busy_val register 1508 since it is common to all banks.

The store data busy counter 1502 is initiated when the "need bank" signal 916 and the "store" signal 922 received from the arbitrator 910 is equal to 1 and when the "bank addr" 918 is equal to the Bank_id 1510. This counter increments (counts) for either 8 or 16 beats (based on the length of the operation) and resets either after the store operation has completed or has been cancelled. Once the store operation reaches a point where the busy portion of a new command, such as a refresh or fetch, would overlap with the write_b portion of the store operation in progress (see, for example, cycle 7 in the timing diagram of FIG. 12) the block counter 1504 is initialized, which indicates the window where another operation, such as a refresh or a fetch, cannot operate within. The initialization of the operation block counter 1504 is conditional based on the length of the transaction (e.g., 8 beats or 16 beats) minus the busy value. For example, if the length of the transaction is 8 beats and the busy time is 4 cycles the operation block counter 1504 is started at 4 cycles. The operation block counter 1504 is stopped either when the operation is cancelled or when the count is equal to 2 times the busy value (e.g., 4 cycles or 5 cycles).

The fetch busy counter 1506 is initiated when the "need bank" signal 916 and the "fetch" signal 922 received from the arbitrator 910 is equal to 1 and when the "bank addr" 918 is equal to the Bank_id 1510. The fetch busy counter 1506 can also be initialized when a refresh_grant 934 is sent to the refresh controller 914, as discussed above. In other words the start of a fetch operation or a refresh operation triggers an initialization of this counter 1506. This counter increments (counts) for the length of the data transfer or until the counter is equal to the number of busy cycles set for the chip (e.g., 4 or 5 cycles) and one refresh is in progress. The fetch busy counter 1506 can also rest if the counter is equal to 2 times the Busy_val and two refreshes are in progress. The fetch busy counter 1506 can also rest if fetch operation is cancelled and the count is greater than or equal to the Busy_val.

Figure 16:
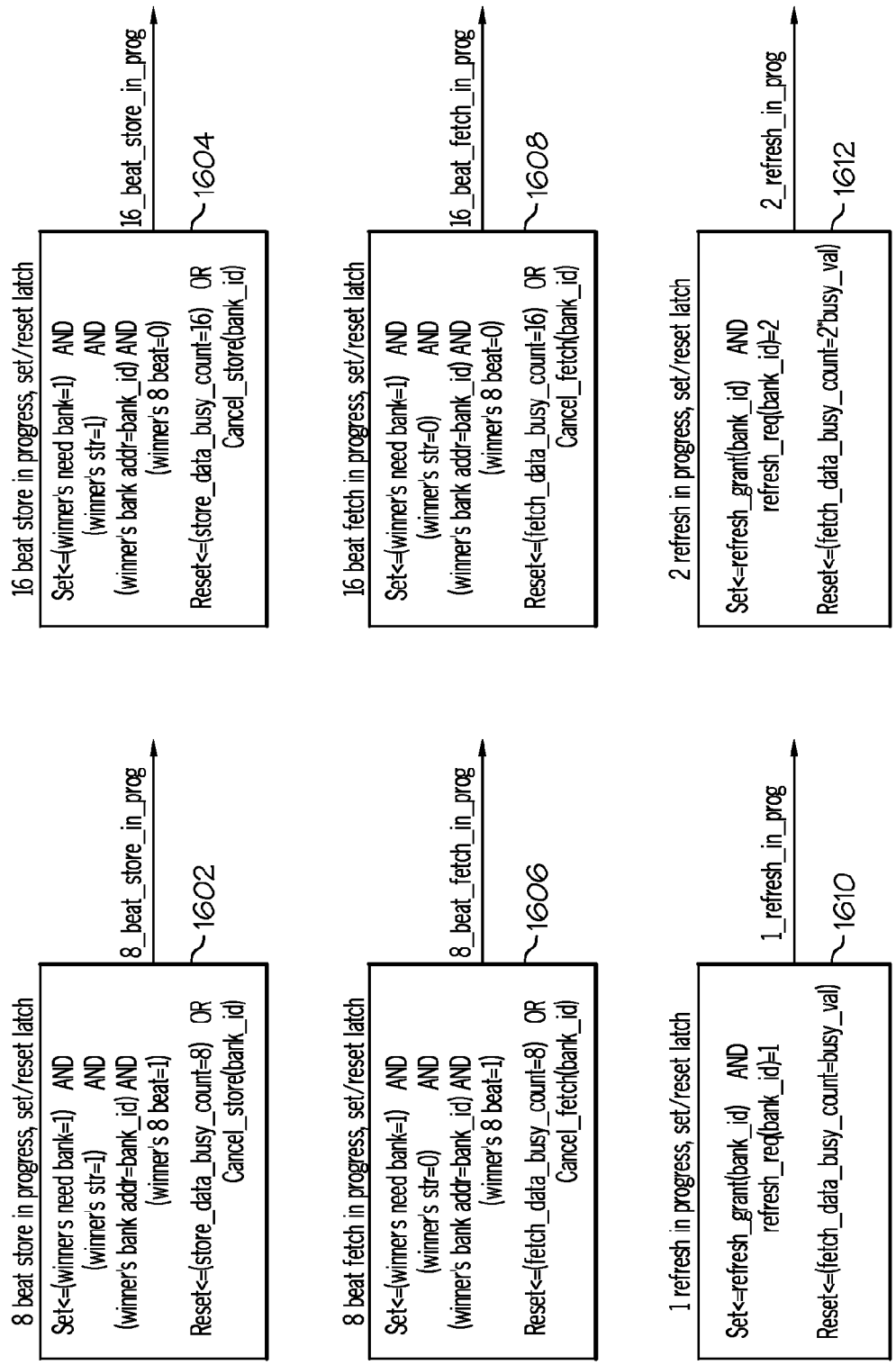
FIG. 16 shows a set of registers used to track model cache bank availability for variable busy and access times according to one embodiment of the present invention.

FIG. 16 shows a set of latches 1602, 1604, 1606, 1608, 1610, 1612, which can be single bit control registers that are also within the bank model 912. There are 16 sets of these registers in the modeler 912, one for each of the 16 banks on the L4 cache chip 400. For example, FIG. 16 shows that there is an 8 beat store in progress set/reset latch 1602, a 16 beat store in progress set/reset latch 1604, an 8 beat fetch in progress set/reset latch 1606, a 16 beat fetch in progress set/reset latch 1608, a 1 refresh in progress set/reset latch 1610, and a 2 fetch in progress set/reset latch 1612. These latches are used by the modeler 912 to determine when an operation is in progress. The bank modeler 912 utilizes the information received from the arbitrator 910 to set the latches. For example, when the arbitrator has selected an 8 beat store it sends the "need bank" 916, "str" 922, "bank addr" 918, and "8 vs. 16 beat" information 920 to The bank modeler 912 checks this information and if this information matches the conditions for an 8 beat store (i.e., "need bank"=1, "str"=1, "bank addr" is equal to Bank_id 1510, and "8 vs. 16 beat"=8 it sets the latch 1602 to indicate an 8 beat store is in progress. This latch 1608 is reset when the store busy counter 1502 is equal to the length of the operations, e.g., 8 beats in this example, or if the operation is cancelled.

Based on these counters, registers, and latches the modeler 912 is able to monitor the cache resources. For example, these counters, registers, and latches allow the modeler 912 to identify when a particular bank is busy and the time frame until another operation can start on that bank. Based on this information the modeler 912 is able to send the vectors 926, 928 discussed above to the filtering module 904.

FIG. 17 shows one example, of outputs (and intermediary signals) from the modeler 912 based on the modeling of cache resources as represented by the counters, registers, and latches discussed above. There are 16 sets of these outputs from the model, one for each of the 16 banks on the L4 cache chip 400. In particular, FIG. 17 shows that the bank modeler 912 can output a bank_available_store_vector(bank_id) 1702 (e.g., vector 926 in FIG. 9) for a given bank if the store data busy counter 1502 and operation block counter 1504 are not initialized for that given bank and there are not two refresh operations associated with that given bank and the fetch busy counter 1506 for that given bank has a count of less than two times the Busy_val 1508 minus 8 (which allows the store to operate while the fetch is gathering its data). FIG. 17 also shows that that the bank modeler 912 can output a bank_available_fetch_vector(bank_id) 1704 (e.g., vector 928 in FIG. 9)

for a given bank if the fetch data busy counter 1502 is not initialized for that given bank, a refresh_request 932 has not been received for that bank, and of the operation block 1504 has not been initialized for that given bank.

FIG. 17 also shows that that the bank modeler 912 can output a refresh_grant(bank_id) 1706 (e.g., 934 in FIG. 9) for a given bank if 1.) the fetch data busy counter 1502 is not initialized for that given bank or if the fetch busy counter 1504 is initialized but its count is greater than Busy_val 1508 and 2.) a refresh request 932 has been received for that given bank and the block operation counter 1504 is not initialized for that given bank, or 3.) two refresh requests 932 have been received for that given bank and the FIG. 17 also shows that that the bank modeler 912 can output a bank_available_fetch_vector (bank_id) 1704 (e.g., vector 916 in FIG. 9) for a given bank if the fetch data busy counter 1502 is not initialized for that given bank, a refresh_request has not been received for that bank, and of the operation block 1504 has not been initialized for that given bank and the store data busy counter 1502 count plus (2*Busy_val) is less than the length of cycles of a current store operation in progress. FIG. 17 also shows that that the bank modeler 912 can output a str_data_done(bank_id) 1708 that indicates when a store operation will finish (e.g., either in 8 cycles or 16 cycles) for a given bank. The str_data_done (bank_id) is less than or equal to 8 when the 8 beat store in progress set/reset latch 1602 has an output of 8_beat_store_in_prog(bank_id) for the given bank. Otherwise the str_data_done(bank_id) is equal to 16 beats.

As can seen from the above discussion, various embodiments of the present invention utilize a centralized bank model that tracks the usage of address sliced cache resources by current operations and provides two bits vectors to indicate bank availability for both fetch and store operations for every bank in the L4 cache 214. These bit vectors are used to filter cache requests for a large number, e.g., approximately 100, controllers per cache chip, suppressing the requests of any controller requiring access to a bank that is not available for the requested access type. The usage of each bank's resources is modeled with counters and shift registers. These resources include fetch and store data buses, and the ability of the EDRAM macros comprising the bank to accept a new command. The values these counters and shift registers are compared to are varied based on system wide settings that also control the performance parameter inputs to all of the EDRAMs in the L4 cache 214. This allows for accurate and efficient modeling of the cache resource usage, in turn allowing for pipeline packing or back-to-back cache accesses, across the entire range of EDRAM performance settings.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Figure 18:
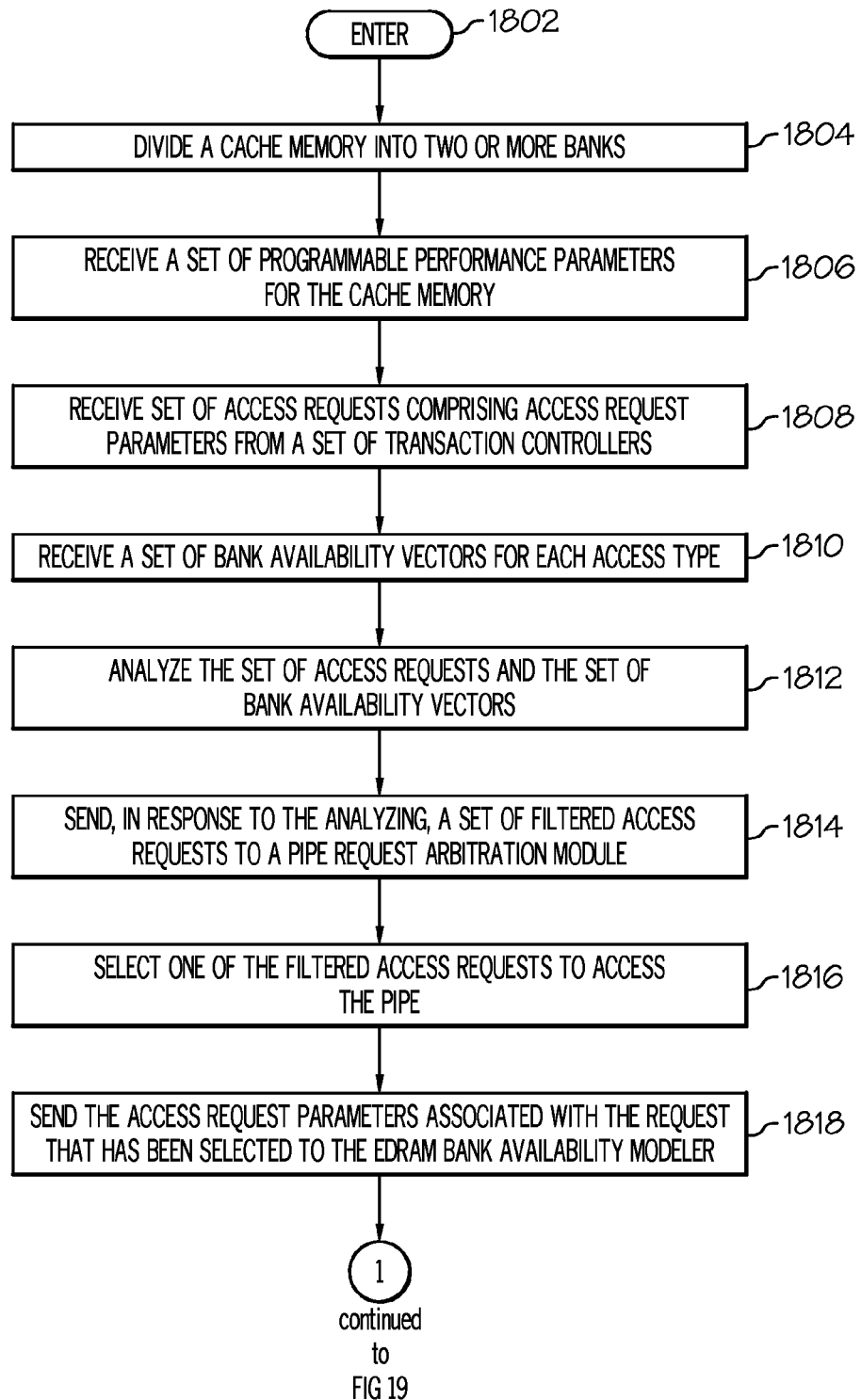
FIGS. 18-20 are operational flow diagrams illustrating one example of a process for modeling cache bank availability for a cache memory comprising variable performance parameters according to one embodiment of the present invention.

Referring now to FIG. 18, the flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 18 is operational flow diagram illustrating one example of managing access to an L4 EDRAM cache comprising variable access and busy times. The operational flow diagram of FIG. 18 begins at step 1802 and flows directly to step 1804. The L4 cache memory 214, at step 1804, is divided into two or more banks 404. The cache controller 414, at step 1806, receives a set of programmable performance parameters such as busy time and access time for the L4 cache memory 214. The cache controller 414, at step 1808, receives a set of access requests comprising access request parameters 916, 918, 920, 922, 924 from a set of transaction controllers 908, 906.

Figure 19:
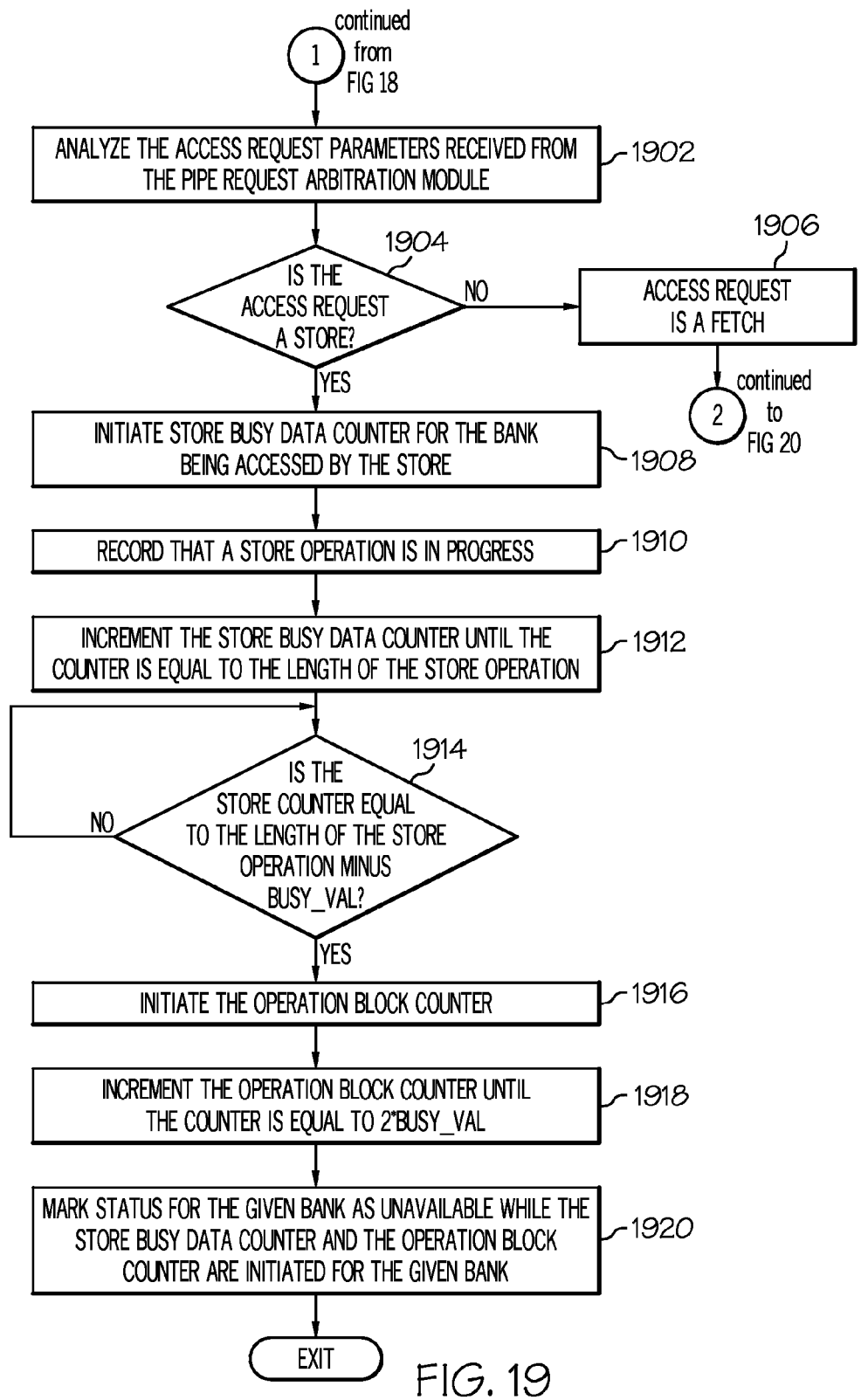

The cache controller 414, at step 1810, receives a set of cache bank availability vectors 926, 928 for each access type. The pipe request filtering module 904, at step 1812, analyzes the set of access requests and the set of bank availability vectors 926, 928. The pipe request filtering module 904, at step 1814, sends a set of filtered access requests 930 to the arbitration module 910 (which is part of the cache controller 414) in response to the analyzing. The arbitration module 910, at step 1816, selects one of the filtered access requests to access the pipe. The arbitration module 910, at step 1818, sends the access request parameters 916, 918, 920, 922, 924 associated with the selected access request to the EDRAM bank availability modeler 912. The control then flows to entry point A of FIG. 19.

Figure 20:
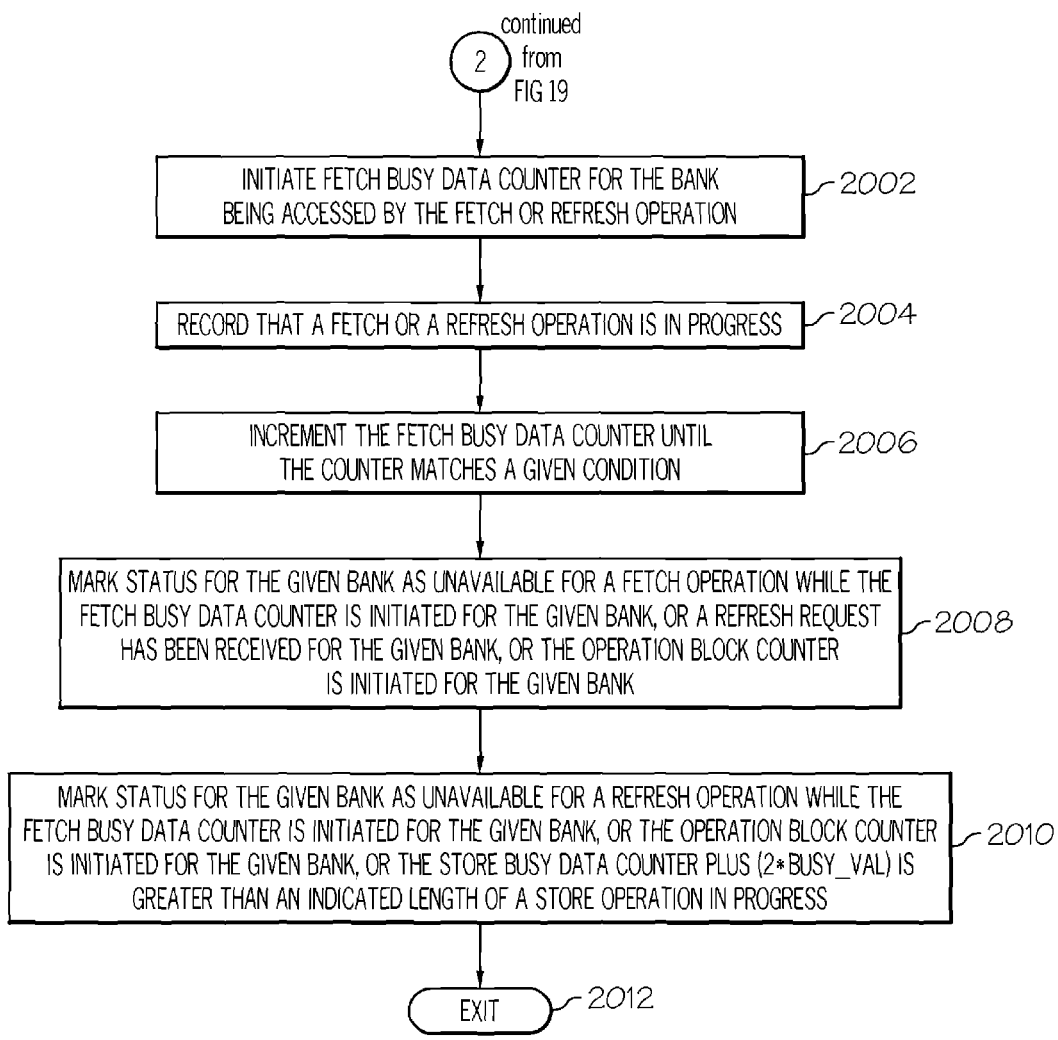

The bank availability modeler 912, at step 1902, analyzes the access request parameters 916, 918, 920, 922, 924 received from the arbitration module 910. The bank availability modeler 912, at step 1904, determines if the access request that has been selected is a store operation. If the result of this determination is negative, the bank availability modeler 912, at step 1906, determines that the access request a fetch. The control then flows to entry point B of FIG. 20. If Alternatively, the bank availability monitor 912 also determines if a refresh request 932 has been received from the refresh controller 914. If so the control then flows to entry point B of FIG. 20. If the result of this determination at step 1904 is positive, then the bank availability modeler 912, at step 1908, initiates a store busy data counter 1502 for the bank 404 being accessed by the store operation. The bank availability modeler 912, at step 1910, marks that a store operation is in progress for the given bank 404 (see, for example, FIG. 16). The bank availability modeler 912, at step 1912, increments the store busy data counter 1502 until the counter is equal to the length of the store operation as indicated by one of the access request parameters 922.

The bank availability modeler 912, at step 1914, determines if the store busy data counter 1502 is equal to the length of the store operation (e.g., 8 beats of 16 beats) minus the Busy_val 1508 (e.g., 4 cycles of 5 cycles). If the result of this determination is negative, the bank availability modeler 912 continues to monitor the store busy data counter at step 1914. If the result of this determination is positive, the bank availability modeler 912, at step 1916, initiates the operation block counter 1504. The bank availability modeler 912, at step 1918, increments the operation block counter 1504 until the counter is equal to 2*Busy_val. The bank availability modeler 912, at step 1920, then marks the status for the given bank 404 as unavailable for a store operation when the store busy data counter 1502 and the operation block counter 1504 are initiated for the given bank 404.

Returning to step 1906, when the bank availability modeler 912 determines that the access request is either a fetch or refresh operation, the bank availability modeler 912, at step 2002, initiates the fetch busy counter 1506 for the bank 404 being accessed by the fetch or refresh operation. The bank availability modeler 912, at step 2004, marks that a fetch or refresh operation is in progress for the given bank 404 (see, for example, FIG. 16). The bank availability modeler 912, at step 2006, increments the fetch busy data counter 1506 until the counter 1506 matches a given condition such as the counter being equal to the length of the data transfer; the counter being equal to the number of busy cycles set for the chip (e.g., 4 or 5 cycles) and one refresh is in progress; the counter being equal to 2*Busy_val and two refreshes are in progress; and the fetch operation being cancelled and the count is greater than or equal to Busy_val.

The bank availability modeler 912, at step 2008, marks the status of the given bank 404 as being unavailable for a fetch operation while the fetch busy data counter 1506 is initiated for the given bank 404, or a refresh request 932 for the given bank 404 has been received, of the operation block counter 1504 is initiated for the given bank 404. The bank availability modeler 912, at step 2010, marks the status of the given bank 404 as unavailable for refresh operation while the fetch busy counter 1506 is initiated for the given bank 404, or the operation block counter 1504 is initiated for the given bank 404, or the store busy data counter plus (2*Busy_val) is greater than an indicated length of a store operation in progress. The control flow then exits at step 2012.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing access to a cache memory, the method comprising:
   generating a plurality of cache bank availability vectors associated with a set of cache banks each configured to simultaneously execute multiple operations of different types, wherein the plurality of cache bank availability vectors is generated based on
      a current set of cache access requests currently operating on the set of cache banks, and
      at least a variable busy time of a cache memory comprising the set of cache banks, wherein the plurality of cache bank availability vectors indicates an availability of the set of cache banks, and
      wherein at least two of the plurality of cache bank availability vectors indicate an availability of a single cache bank in the set of cache banks for an access of a first operation type and an access of a second access type, respectively;
   receiving a set of cache access requests for accessing one or more of the set of cache banks, wherein each of the set of cache access requests comprises a set of access request parameters; and
   selecting at least one of the set of cache access requests to access at least one of the set of cache banks based on
      at least one of the plurality of cache bank availability vectors associated with the at least one of the set of cache banks, and
      the set of access request parameters associated with the at least one of the set of cache access requests that has been selected.

2. The method of claim 1, wherein generating the plurality of cache bank availability vectors further comprises:
   determining, for each cache bank in the set of cache banks, a type of operation associated with the cache access request in the current set of cache access requests operating on the cache bank; and
   based on determining that the type of operation is of a first type in a set of types,
   initiating a first counter associated with the cache bank, the first counter counting for a programmable length of data transfer associated with the cache access request;
   determining that the first counter is equal to the programmable length minus the variable busy time; and
   initiating a second counter associated with the cache bank, the second counter counting for an interval of time equal to a multiple of the variable busy time.

3. The method of claim 2, wherein other access requests are prevented from accessing the cache bank when the second counter is counting.

4. The method of claim 2, further comprising:
   setting a cache bank availability vector associated with access requests of the first type in the plurality of cache bank availability vectors to indicate the cache bank is unavailable based on the first counter and the second counter being initialized and counting.

5. The method of claim 2, further comprising:
   setting a cache bank availability vector associated with access requests of a second type in the plurality of cache bank availability vectors to indicate the cache bank is available based on the first counter being initialized.

6. The method of claim 2, wherein generating the plurality of cache bank availability vectors further comprises:
   based on determining that the type of operation is of a second type in a set of types,
   initiating a third counter associated with the cache bank, the third counter counting for a programmable length of data transfer associated with the access request.

7. The method of claim 6, further comprising:
   setting a cache bank availability vector associated with access requests of the second type in the plurality of cache bank availability vectors to indicate the cache bank is unavailable in response to the first counter being initialized and counting.

8. The method of claim 6, wherein generating the plurality of cache bank availability vectors further comprises:
   based on determining that the type of operation is of a third type in a set of types,
   initiating a fourth counter associated with the cache bank, the fourth counter counting for a multiple of the variable busy time.

9. An information processing device for managing access to a cache memory, the information processing device comprising:
   at least one processor;
   at least one cache memory communicatively coupled to the at least one processor; and
   at least one cache controller communicatively coupled to the at least one cache memory and the at least one processor, wherein the at least one cache controller comprises:
      a cache bank availability modeler configured to perform a method comprising:
         generating a plurality of cache bank availability vectors associated with a set of cache banks each configured to simultaneously execute multiple operations of different types, wherein the plurality of cache bank availability vectors is generated based on
            a current set of cache access requests currently operating on a set of cache banks, and
            at least a variable busy time of a cache memory comprising the set of cache banks, wherein the plurality of cache bank availability vectors indicates an availability of the set of cache banks, and
         wherein at least two of the plurality of cache bank availability vectors indicate an availability of a single cache bank in the set of cache banks for an access of a first operation type and an access of a second access type, respectively; and
      a pipe request filtering module configured to perform a method comprising:
         receiving a set of cache access requests for accessing one or more of the set of cache banks, wherein each of the set of cache access requests comprises a set of access request parameters; and
         selecting at least one of the set of cache access requests to access at least one of the set of cache banks based on
            at least one of the plurality of cache bank availability vectors associated with the at least one of the set of cache banks, and the set of access request parameters associated with the at least one of the set of cache access requests that has been selected.

10. The information processing device of claim 9, wherein generating the plurality of cache bank availability vectors further comprises:
   determining, for each cache bank in the set of cache banks, a type of operation associated with the cache access request in the current set of cache access requests operating on the cache bank; and
   based on determining that the type of operation is of a first type in a set of types,
   initiating a first counter associated with the cache bank, the first counter counting for a programmable length of data transfer associated with the cache access request;
   determining that the first counter is equal to the programmable length minus the variable busy time; and
   initiating a second counter associated with the cache bank, the second counter counting for an interval of time equal to a multiple of the variable busy time, wherein other access requests are prevented from accessing the cache bank when the second counter is counting.

11. The information processing device of claim 10, wherein the cache bank availability modeler is further configured to perform a method comprising at least one of:
   setting a cache bank availability vector associated with access requests of the first type in the plurality of cache bank availability vectors to indicate the cache bank is unavailable based on the first counter and the second counter being initialized and counting; and
   setting a cache bank availability vector associated with access requests of a second type in the plurality of cache bank availability vectors to indicate the cache bank is available based on the first counter being initialized.

12. The information processing device of claim 10, wherein generating the plurality of cache bank availability vectors further comprises at least one of:
   based on determining that the type of operation is of a second type in a set of types, initiating a third counter associated with the cache bank, the third counter counting for a programmable length of data transfer associated with the access request; and
   based on determining that the type of operation is of a third type in a set of types, initiating a fourth counter associated with the cache bank, the fourth counter counting for a multiple of the variable busy time.

13. A tangible computer program product for managing access to a cache memory, the tangible computer program product comprising:
   a storage medium readable by a processing circuit and storing instructions for execution by the processing circuit for performing a method comprising:
   generating a plurality of cache bank availability vectors associated with a set of cache banks each configured to simultaneously execute multiple operations of different types, wherein the plurality of cache bank availability vectors is generated based on
      a current set of cache access requests currently operating on the set of cache banks, and
      at least a variable busy time of a cache memory comprising the set of cache banks, wherein the plurality of cache bank availability vectors indicates an availability of the set of cache banks, and
   wherein at least two of the plurality of cache bank availability vectors indicate an availability of a single cache bank in the set of cache banks for an access of a first operation type and an access of a second access type, respectively;
   receiving a set of cache access requests for accessing one or more of the set of cache banks, wherein each of the set of cache access requests comprises a set of access request parameters; and
   selecting at least one of the set of cache access requests to access at least one of the set of cache banks based on
      at least one of the plurality of cache bank availability vectors associated with at least one of the set of cache banks, and
      the set of access request parameters associated with the at least one of the set of cache access requests that has been selected.

14. The tangible computer program product of claim 13, wherein generating the plurality of cache bank availability vectors further comprises:
   determining, for each cache bank in the set of cache banks, a type of operation associated with the cache access request in the current set of cache access requests operating on the cache bank; and
   based on determining that the type of operation is of a first type in a set of types,
   initiating a first counter associated with the cache bank, the first counter counting for a programmable length of data transfer associated with the cache access request;
   determining that the first counter is equal to the programmable length minus the variable busy time; and
   initiating a second counter associated with the cache bank, the second counter counting for an interval of time equal to a multiple of the variable busy time.

15. The tangible computer program product of claim 14, wherein other access requests are prevented from accessing the cache bank when the second counter is counting.

16. The tangible computer program product of claim 14, the method further comprising:
   setting a cache bank availability vector associated with access requests of the first type in the plurality of cache bank availability vectors to indicate the cache bank is unavailable based on the first counter and the second counter being initialized and counting.

17. The tangible computer program product of claim 14, the method further comprising:
   setting a cache bank availability vector associated with access requests of a second type in the plurality of cache bank availability vectors to indicate the cache bank is available based on the first counter being initialized.

18. The tangible computer program product of claim 14, wherein generating the plurality of cache bank availability vectors further comprises:
   based on determining that the type of operation is of a second type in a set of types,
   initiating a third counter associated with the cache bank, the third counter counting for a programmable length of data transfer associated with the access request.

19. The tangible computer program product of claim 18, the method further comprising:
   setting a cache bank availability vector associated with access requests of the second type in the plurality of cache bank availability vectors to indicate the cache bank is unavailable in response to the first counter being initialized and counting.

20. The tangible computer program product of claim 18, wherein generating the plurality of cache bank availability vectors further comprises:

based on determining that the type of operation is of a third type in a set of types, initiating a fourth counter associated with the cache bank, the fourth counter counting for a multiple of the variable busy time.

* * * * *